United States Patent [19]
Niwata et al.

[11] Patent Number: 6,070,794
[45] Date of Patent: Jun. 6, 2000

[54] CARD UNIT PROCESSING APPARATUS

[75] Inventors: Tsuyoshi Niwata; Shigeru Hashimoto, both of Kawasaki, Japan

[73] Assignee: Fujitsu Limited, Kawasaki, Japan

[21] Appl. No.: 08/934,850

[22] Filed: Sep. 22, 1997

[30] Foreign Application Priority Data

Apr. 18, 1997 [JP] Japan .................................. 9-101469

[51] Int. Cl.⁷ .................................................... G06K 5/00
[52] U.S. Cl. ........................ 235/380; 235/492; 235/486; 705/15
[58] Field of Search .................................. 235/380, 451, 235/486, 492, 495; 902/26; 705/17

[56] References Cited

U.S. PATENT DOCUMENTS

| | | | |
|---|---|---|---|
| 4,523,087 | 6/1985 | Benton | 235/379 |
| 4,720,626 | 1/1988 | Nishikawa et al. | 235/449 |
| 5,440,108 | 8/1995 | Tran et al. | 235/381 |
| 5,521,362 | 5/1996 | Powers | 235/380 |
| 5,644,750 | 7/1997 | Iijima | 235/437 |
| 5,661,285 | 8/1997 | Elrick et al. | 235/380 |
| 5,698,836 | 12/1997 | Fujioka | 235/492 |
| 5,705,798 | 1/1998 | Tarbox | 235/379 |
| 5,729,717 | 3/1998 | Tamada et al. | 235/380 |

FOREIGN PATENT DOCUMENTS

| | | |
|---|---|---|
| 61-68683 | 4/1986 | Japan . |
| 3-92966 | 4/1991 | Japan . |
| 8-279026 | 10/1996 | Japan . |
| 8-287169 | 11/1996 | Japan . |

*Primary Examiner*—Donald Hajec
*Assistant Examiner*—Daniel St. Cyr
*Attorney, Agent, or Firm*—Armstrong, Westerman, Hattori, McLeland & Naughton

[57] ABSTRACT

A card unit processing apparatus can conduct various processes on a card unit so as to realize multi-functioning. The card unit processing apparatus is attached a card unit with a storage unit thereto to conduct processes on the card unit, which has a communicating unit, a display unit, a control unit, a power source, a first key pressed when a processing function to be performed on the card unit is selected, a second key pressed when detailed data relating to the function selected by pressing the first key is selected, and a third key pressed when the data selected by pressing the first key and the second key is determined, wherein the control unit conducts controlling operations according to presses of the first key, the second key and the third key. This invention is applied when a card unit such as an IC card, an optical card, a radio card or the like is used as a portable medium for electronic money, for example.

35 Claims, 32 Drawing Sheets

| | CURRENCY INFORMATION (BALANCE INFORMATION) |
|---|---|
| POCKET NO. 00 | US$ 100 |
| POCKET NO. 01 | JP¥ 50000 |
| POCKET NO. 02 | GBP 1000 |

|  | CURRENCY INFORMATION (BALANCE INFORMATION) |
|---|---|
| POCKET NO. 00 | JP¥ 50000 |
| POCKET NO. 01 | GBP 1000 |
| POCKET NO. 02 | US$ 100 |

CREDIT LOG INFORMATION

| | CURRENCY | AMOUNT | TRANSACTION DATE AND TIME | SERIAL NUMBER |
|---|---|---|---|---|
| RECORD NO. 00 | JP ¥ | 500 | 97. 02. 10. 10 | 0106 |
| RECORD NO. 01 | JP ¥ | 200 | 00. 00. 00. 00 | 0105 |
| RECORD NO. 02 | US $ | 100 | 97. 02. 01. 08 | 0104 |
| RECORD NO. 03 | JP ¥ | 800 | 97. 01. 10. 15 | 0103 |

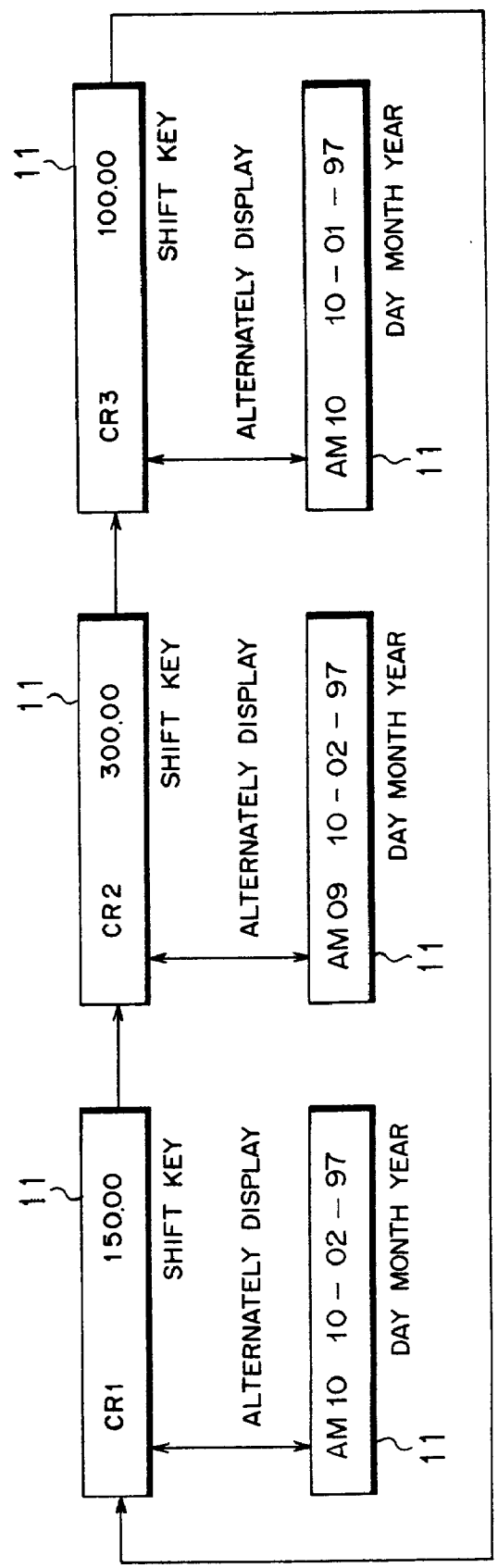

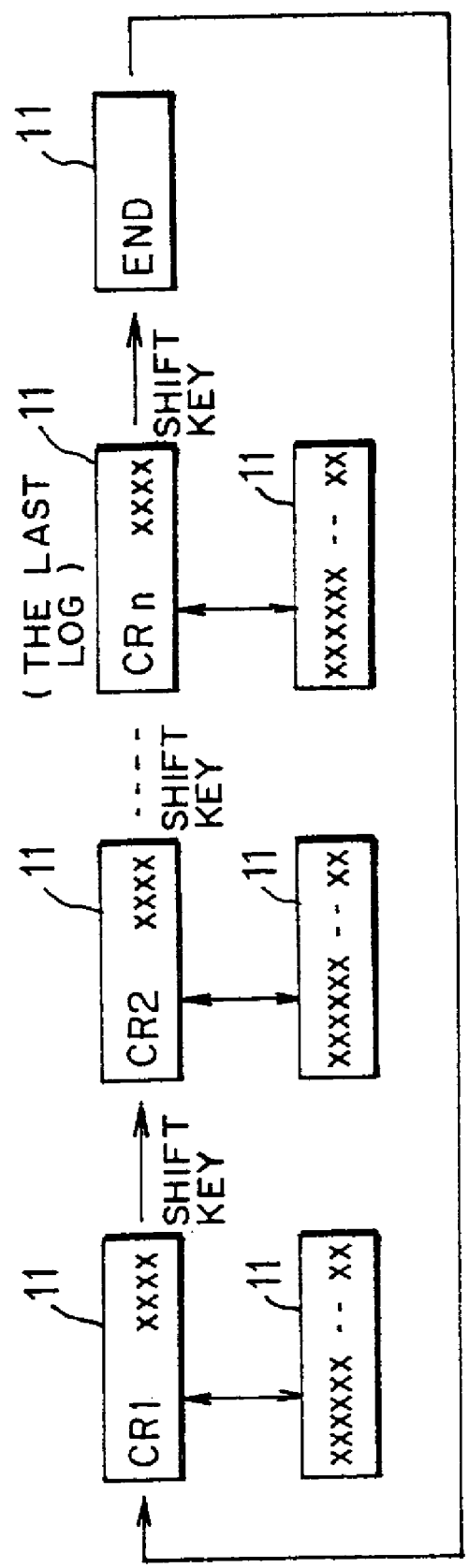

CARD UNIT PROCESSING APPARATUS

BACKGROUND OF THE INVENTION

1). Field of the Invention

The present invention relates to a portable card unit processing apparatus which can read/display/change various information (numerical value information, transaction log, etc.) stored in a card unit (hereinafter, abbreviated as CU occasionally) such as an IC card, an optical card, a radio card or the like.

2). Description of the Relaged Art

There has been developed an electronic money system which enables cashless commercial transactions for these years. As a portable medium for electronic money, there is, in general, used a card unit (card-type storage medium) having a storage, more concretely, an IC card in which an integrated circuit (IC) is incorporated. Aportable balance display (balancer) is used by the holder of the IC card to refer a balance of electronic money stored in the storage of the IC card.

A general balance display (processing apparatus) is configuredas shown in FIGS. 34 through 36, for example.

As shown in FIG. 34(a), a balance display (card unit processing apparatus, 100 has a display unit 101 such as a liquid crystal display. An IC card 200 having a memory (storage unit) 201 and a terminal unit 202 is inserted to the balance display 100 as shown in FIG. 34(b), whereby a balance of electronic money ["10,000 in FIG. 34(b), for example] stored in the memory 201 is displayed on the display unit. 101 of the balance display 100.

Referring to FIGS. 35 and 36, a hardware structure of the balance disclaw 100 will be next described in more detail.

The balance display 100 has, in addition to the above-mentioned display unit 101, an MPU 102, an oscillator 103, a ROM 104, a RAM 105, a communicating unit 106, a terminal unit 107, a bus 108, a battery 109 and a power supplying switch 110, as shown in FIGS. 35 and 36.

Here, the display unit 101, the MPU 102, the ROM 104, the RAM 105 and the communicating unit 106 are connected to each other by the bus 108.

The MPU (MicroProcessor Unit) 102 operates with a clock fed from the oscillator 103 to collectively control operations of the balance display 100. The MPU 102 so controls as to read out a balance of electronic money from the memory 201 of the IC card 200 inserted to the balance display 100 and display the balance on the display unit 101.

The ROM 104 holds a program and the like used to conduct controlling operations by the MPU 102. The RAM 105 is used as a work area or the like when the MPU 102 conducts the controlling operations.

The communicating unit 106 has the terminal unit 107 contacting with the terminal unit 202 of the IC card 200 inserted to the balance display 100, as shown in FIG. 34(b), to communicate with the IC card 200 (memory 201) via the terminal units 107 and 202.

As shown in FIG. 36, the balance display 100 has the battery 109 for supplying power to each part of the balance display 100 and the IC card 200. In the balance display 100, the power is supplied from the battery 109 by closing the power supplying switch 110. The power supplying switch 110 is mechanically closed, interlocked with insertion of the IC card 200 into the balance display 100, or is closed in a manual operation by an operator (a holder of the IC card 200).

In the balance display 100 with the above structure, when the IC card 200 is inserted thereto, the power supplying switch 110 is closed, whereby the power from the battery 109 is supplied to each part of the balance display 100, besides supplied to the IC card 202 via the terminal units 107 and 202.

A balance of electronic money is read out, in the controlling operation by the MPU 102, from the memory 201 of the IC card 200 inserted in the balance display 100 via the terminal units 202 and 107, and the communicating unit 106. The balance is displayed on the display unit 101, as shown in FIG. 34(b).

As stated above, the balance display 100, which is a general card unit crossing apparatus, has only a function of displaying a balance of electronic money stored in the IC card 200. However, the portable balance display 100 as above also has the MPU 102, the ROM 104, the RAM 105, etc. along with the display unit 101, as stated above. If these structural elements can be effectively used to realize not only the balance displaying function but also other various functions, it is possible to more improve usefulness of the IC card 200 to the holder. Upon which, it is desirable to realize multi-functioning only by adding a minimum number of parts without causing complexity of the apparatus structure.

SUMMARY OF THE INVENTION

In the light of the above problem, an object of the present invention is to provide a card unit processing apparatus which can conduct various Processes on a card unit without complicating a structure of the apparatus only by additionally providing a minimum number of parts so as to realize multi-functioning.

The present invention therefore provides a card unit processing apparatus provided with a card unit with a storage unit to conduct processes on the card unit comprising a communicating unit for communicating with the card unit, a display unit for displaying display data including data read out from the storage unit of the card unit via the communicating unit, a control unit for conducting controlling operations including a display state control of the display unit and a data reading/writing control of the storage unit of the card unit, a power source unit for supplying electric power to the communicating unit, the display unit and the control unit, a first key pressed when a processing function performed on the card unit is selected, a second key pressed when detailed data relating to the function selected by pressing the first key is selected, and a third key pressed when the data selected by pressing the first key and the second key is determined, wherein the control unit conducts the controlling operations according to presses of the first key, the second key and the third key.

According to the card unit processing apparatus of this invention, it is possible to conduct various processes on the card unit without complicating a structure of the apparatus only by additionally providing three types of keys so as to realize multi-functioning. As a result, usefulness to a holder of the card unit may be largely improved, besides operations according to the various functions may be readily conducted using the three types of keys.

BRIEF DESCRIPTION OF THE DRAWINGS

FIG. 9(a) is a diagram showing a concrete example of numerical information, whereas FIG. 9(b) is a diagram for illustrating a display state of the numerical information shown in FIG. 9(a);

FIG. 10(a) is a diagram showing a concrete example when a pocket (a first piece of balance information) of the numerical information is changed; whereas FIG. 10(b) is a diagram for illustrating a display state of the numerical information shown in FIG. 10(a);

FIG. 12(a) is a diagram showing a concrete example of credit log information; whereas FIG. 12(b) is a diagram for illustrating a display state of the credit log information shown in FIG. 12(a);

FIG. 13 is a diagram for illustrating a modification of the display state of the credit log in formation;

FIG. 14 is a diagram for illustrating another modification of the display state of the credit log information;

DESCRIPTION OF THE PREFERRED EMBODIMENTS

I. Description of Aspect of the Invention

Figure 1:
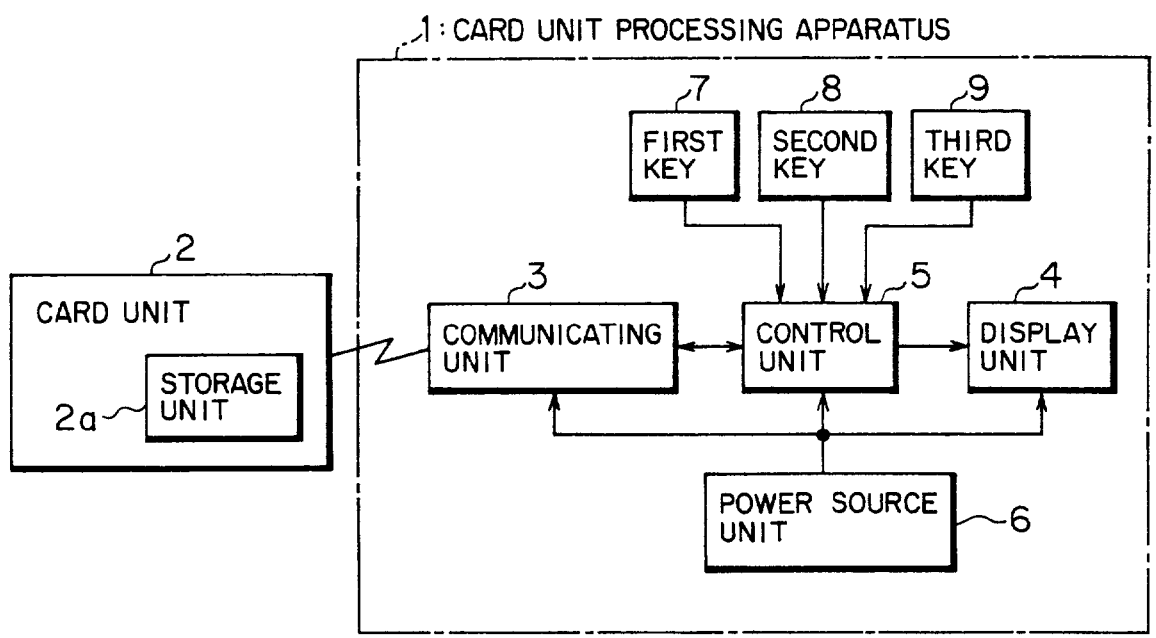
FIG. 1 is a block diagram showing an aspect of this invention.
Figure 2:
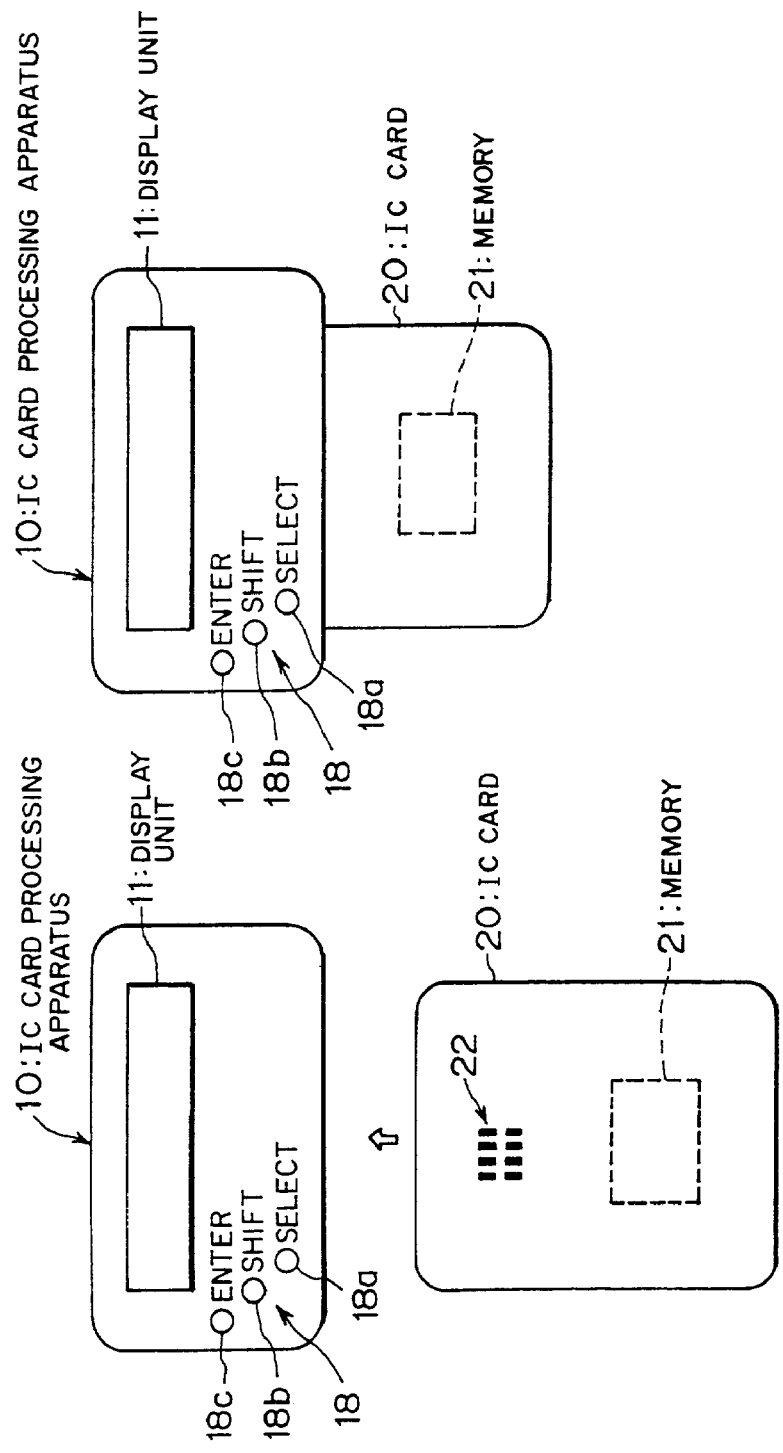
FIGS. 2(a) and 2(b) are plan views schematically showing appearances of a card unit processing apparatus according to an embodiment of this invention when a card unit is not inserted thereinto and when the card unit is inserted thereinto, respectively.

FIG. 1 is a block diagram showing an aspect of this invention. A card unit processing apparatus 1 shown in FIG. 1 is attached a card unit 2 with a storage unit 2a thereto to conduct processes on the card unit 2. The card unit processing apparatus 1 has a communicating unit 3, a display unit 4, a control unit 5, a power source unit 6, a first key 7, a second key 8 and a third key 9.

The communicating unit 3 communicates with the card unit 2. The display unit 4 displays display data including, data read out from the storage unit 2a of the card unit 2 via the communicating unit 3. The control unit 5 conducts controlling operations including a display state control of the display unit 4 and data a read/write control of the storage unit 2a of the card unit 2. The power source unit 6 supplies electric power to the communicating unit 3, the display unit 4 and the control unit 5.

The first key 7 is pressed when a processing function to be performed on the card unit 2 is selected. The second key 8 is pressed when detailed data relating to the function selected by a cress of the first key 7 is selected. The third key 9 is pressed when the data selected by presses of the first key 7 and the second key 8 is determined. The control unit 5 conducts the controlling operations according to presses of the first key 7, the second key 8 and the third key 9.

As functions selected by a press of said first key 7, there are a numerical value data displaying function of displaying numerical value data stored in the storage unit 2a of the card unit 2 on the display unit 4, a transaction history displaying function of displaying a transaction history relating to the card unit 2 on the display unit 4 and a status displaying function of displaying a status of the card unit 2.

As the functions selected by a press of said first key 7, there are also a status changing function of changing a status of the card unit 2, a password changing function of changing a password of the card unit 2, a personal information writing function of writing personal information in the storage unit 2a of the card unit 2, a personal information displaying function of displaying the personal information stored in the storage unit 2a of the card unit 2 on the display unit 4, and a personal information changing function of changing the personal information stored in the storage unit 2a of the card unit 2.

When the card unit 2 is attached to the card unit processing apparatus 1, the control unit 5 executes any one of the above functions as a first function, displays information relating to the first function on the display unit 4, and successively displays information relating to the above functions on the display unit 4 with switching each time the first key 7 is pressed after the information relating to the above first function is displayed on the display unit 4. When the first key 7 is pressed after the information relating to the last function among the above functions is displayed on the display unit 4 according to a press of the first key 7, the control unit 5 again displays the information relating to the above first function on the display unit 4.

When the first key 7 is pressed while a function selected by a press of the first key 7 is executed, the control unit 5 so controls a display state of the display unit 4 as to display an initial display of a function now being executed or the initial display of the next function on the display unit 4.

In a state where the above numerical value data displaying function is selected, the control unit 5 displays numerical value data registered as a first group of numerical value data in the storage unit 2a of the card unit 2 on the display unit 4. If there are two or more groups of numerical data in the storage unit 2a of the card unit 2, the control unit 5 displays the first group of numerical data on the display unit 4, and successively displays a second and the following groups of numerical value data on the display unit 4 with switching each time the second key 8 is pressed. When the second key 8 is pressed after the last group of numerical value data is displayed on the display unit 4 according to a press of the second key 8, the control unit 5 again displays the first group of numerical value data on the display unit 4.

When the third key 9 is pressed in a state where numerical value data other than the above first group of numerical value data is displaced on the display unit 4, the control unit 5 registers the numerical value data being now displayed on the display unit 4 as a new first group of numerical value data in the storage unit 2a of the card unit 2.

When the first key 7 is pressed while the above numerical value data displaying function is selected and executed, the above transaction history displaying function is selected. In the state where the transaction history displaying function is selected, the control unit 5 displays a transaction history relating to numerical value data displayed on the display unit 4 when the first key 7 is pressed on the display unit 4. If there are two or more transaction histories relating to the numerical value data in the storage unit 2a of the card unit 2, the control unit 5 successively displays the second and the following transaction histories on the display unit 4 with switching each time the second key 8 is pressed. When the second key 8 is pressed after the last transaction history is displayed on the display unit 4 according to a press of the second key 8, the control unit 5 again displays the transaction history displayed first on the display unit 4.

At this time, a transaction type, a history number and a transaction value are displayed as the above transaction history for each transaction relating to the above numerical value data on the display unit 4. When successively displaying two or more transaction histories on the display unit 4 with switching each time the second key 8 is pressed, the control unit 5 displays the transaction histories in order of time from the latest transaction history or the oldest transaction history on the display unit 4.

The control unit 5 may alternately display a transaction date/time and a display of a transaction type, a history number and a transaction value as the above transaction history on the display unit 4, or change an arrangement of the transaction date/time and contents of the display according to a type of the numerical value data and display them on the display unit 4. Alternatively, the control unit 5 may display final history display information reporting that all transaction histories relating to the numerical value data are displayed after displaying the last transaction history on the display unit 4 according to a press of the second key 8.

In the state where the above status displaying function or the status changing function is selected, the control unit 5 displays a status of the card unit 2 on the display unit 4.

In a state where the above status changing function is selected when it is necessary to input/collate a password as a condition to be fulfilled when a status of the card unit 2 is changed, the control unit 5 displays a default value in the first digit place on the display unit 4 by a press of the third key 9, changes the value in the first digit place according to a press of the second key 8 to display the value on the display unit 4, judges, in response to a press of the third key 9, a value displayed on the display unit 4 at the time of the press of the third key 9 as a value in the first digit place, displays a default value in the next digit place on the display unit 4 by the following press of the second key 8, judges a value in each digit place in a similar manner, judges that inputting of the password is completed by continuous presses of the third key 9, and transmits the inputted password to the card unit 2 to request a change of the status of the card unit 2. At this time, when receiving a result of collation of the password in the card unit 2, the control unit 5 displays a status of the card unit 2 on the display unit 4 according to the result of the collation.

In a state where the above password changing function is selected, the control unit 5 displays a default value in the first digit place on the display unit 4 by a press of the third key 9 in order to make an operator input a current password, changes the value in the first digit place according to a press of the second key 8 and displays the changed value on the d splay unit 4, judges, in response to a press of the third key 9, a value displayed on the display unit 4 at the time of the press of the third key 9 as a value in the first digit place, displays a default value in the next digit place on the display unit 4 by the following press of the second key 8, judges a value in each digit place in a similar manner, judges that inputting of the current password is completed by continuous presses of the third key 9, displays a default value in the first digit place on the display unit 4 in order to make the operator input a new password, changes the value in the first digit place according to a press of the second key 8, displays the changed value on the display unit 4, judges, in response to a press of the third key 9, a value displayed on the displays unit 4 at the time of the press of the third key 9 as a value in the first digit place, displays a default value in the next digit place on the display unit 4 by the following press of the second key 8, judges a value in each digit place in a similar manner, judges that inputting of the new password is completed by continuous presses to the third key 9, and transmits the current password and the new password inputted to the card unit 2 to request the card unit 2 to change the password.

In a state where the above personal information displaying function is selected, the control unit 5 displaces a first piece of personal information stored in the storage unit 2a of the card unit 2 on the display unit 4. If there are two or more pieces of the personal information in the storage unit 2a of the card unit 2, the control unit 5 displays the first piece of the personal information on the display unit 4, after that, successively displays a second and the following pieces of the personal information on the display unit 4 with changing each time the second key 8 is pressed.

When the third key 9 is pressed while the above personal information displaying function is selected and executed, the above personal information writing function or the above personal information changing function is selected. In a state where the personal information writing function or the personal information changing function is selected, the control unit 5 writes or changes personal information being now displayed on the display unit 4 in the storage unit 2a of the card unit 2 according to presses of the second keen 8 and the third key 9.

When the card unit 2 is attached to the card unit processing apparatus 1, the control unit 5 may start reading data in the storage unit 2a of the card unit 2, and control the display unit 4 to display an initial display simultaneously with completion of the reading of initial display information relating to any one of the above functions.

The card unit processing apparatus according to this invention may further have a judging register in which a reading-completion flag is set at each unit of read information for data having been read out from the storage unit 2a of the card unit 2 by the control unit 5. if the reading-completion flag is set to data requested to be displayed in the judging register, the control register 5 may conduct controlling operation to display the data on the display unit 4.

In a state where the card unit 2 is attached to the card unit processing apparatus 1, the control unit 5 may conduct a process on the card unit 2 as the above controlling operation. If the card unit 2 is not attached to the card unit processing apparatus 1, the control unit 5 may fulfil an original function using the display unit 4.

In this case, the card unit processing apparatus 1 of this invention may have, as the original function, a clock displaying function of displaying time on the display unit 4 by the controlling unit 5, or a memorandum function of storing memorandum information in a memorandum information storing unit and displaying the memorandum information stored in the memorandum information on the display unit 4 by the control unit 5, according to presses of the first key 7, the second key 8 and the third key 9.

The control unit 5 may selectively execute the original function, display information relating to the selected function on the display unit 4, and change the information displayed on the display unit 4, according to presses of the first key 7, the second key 8 and the third key 9.

When the third key 9 is pressed while the above clock displaying function is selected and executed, the control unit 5 shifts to a time adjust mode to change time being now displayed on the display unit 4 according to presses of the first key 7, the second key 8 and the third key 9.

The control unit 5 may control the display unit 4 to display time only during a display period arbitrarily set in advance. Outside the display period, the control unit 5 may control the display unit 4 to temporarily display time only when any one of the first key 7, the second key 8 and the third key 9 is pressed.

When the card unit 2 is not attached to the card unit processing apparatus 1, the card unit processing apparatus 1 may shift to a low power consumption mode to save electric power to be supplied from the power source unit 6 to the communicating unit 3, the display unit 4 and the control unit 5.

In this case, whether the card unit processing apparatus 1 shifts to the low power consumption mode or not may be arbitrarily set by a program executed in the control unit 5. Alternatively, the card processing unit 1 may have a plurality of oscillators oscillating clocks having different frequencies, and a switching unit for selectively switching to a clock fed from any one of the plurality of oscillators and outputting the clock to the control unit 5. In the above low power consumption mode, the switching unit may select a clock fed from an oscillator oscillating a clock in a low frequency, and output the clock to the control unit 5.

According to the card unit processing apparatus 1 of this invention, it is possible to execute various processes on the card unit 2 without complicating a structure of the apparatus only by additionally providing three kinds of keys 7, 8 and 9 so as to realize multi-functioning. As a result, usefulness to a holder of the card unit 2 may be largely improved, and operations according to the various functions may be readily executed by using the three types of keys 7, 8 and 9.

Even when the card unit is not attached, it is possible to realize various functions using the three types of keys 7, 8 and 9, which may largely improve the convenience of the holder of the card unit 2.

Further, the card unit processing apparatus 1 of this invention shifts to the low power consumption mode when the card unit 2 is not attached, whereby a life of the power source unit 6 may be greatly lengthened.

II. Description of a Preferred Embodiment of the Invention

[A] Description of a hardware structure of a card unit processing apparatus according to an embodiment Referring now to FIGS. 2 through 6, a hardware structure of a card unit processing apparatus will be described as an embodiment of this invention. Incidentally, this embodiment will be described by way of an example in which a card unit is an IC card used as a portable medium for electronic money, and this invention is applied to an IC card processing apparatus conducting processes on such IC card.

FIGS. 2(a) and 2(b) are plan views which schematically show appearances or the card unit processing apparatus according to this embodiment of this invention when a card is not inserted to the card unit processing apparatus and when a card is inserted to the same, respectively. As shown in FIGS. 2(a) and 2(b), an IC card processing apparatus (card unit processing apparatus) 10 according to this embodiment is inserted thereinto an IC card 20 having a memory (storage unit) 21 to process the IC card 20. The IC card processing apparatus 100 has a display unit 11 for displaying various information and a key unit 18 operated by a holder (operator) or the like of the IC card 20 on its surface.

As the key unit 18, there are provided three keys, that is, a select key 18a, a shift key 18b and an enter key 1c, which will be described later.

Figure 3:
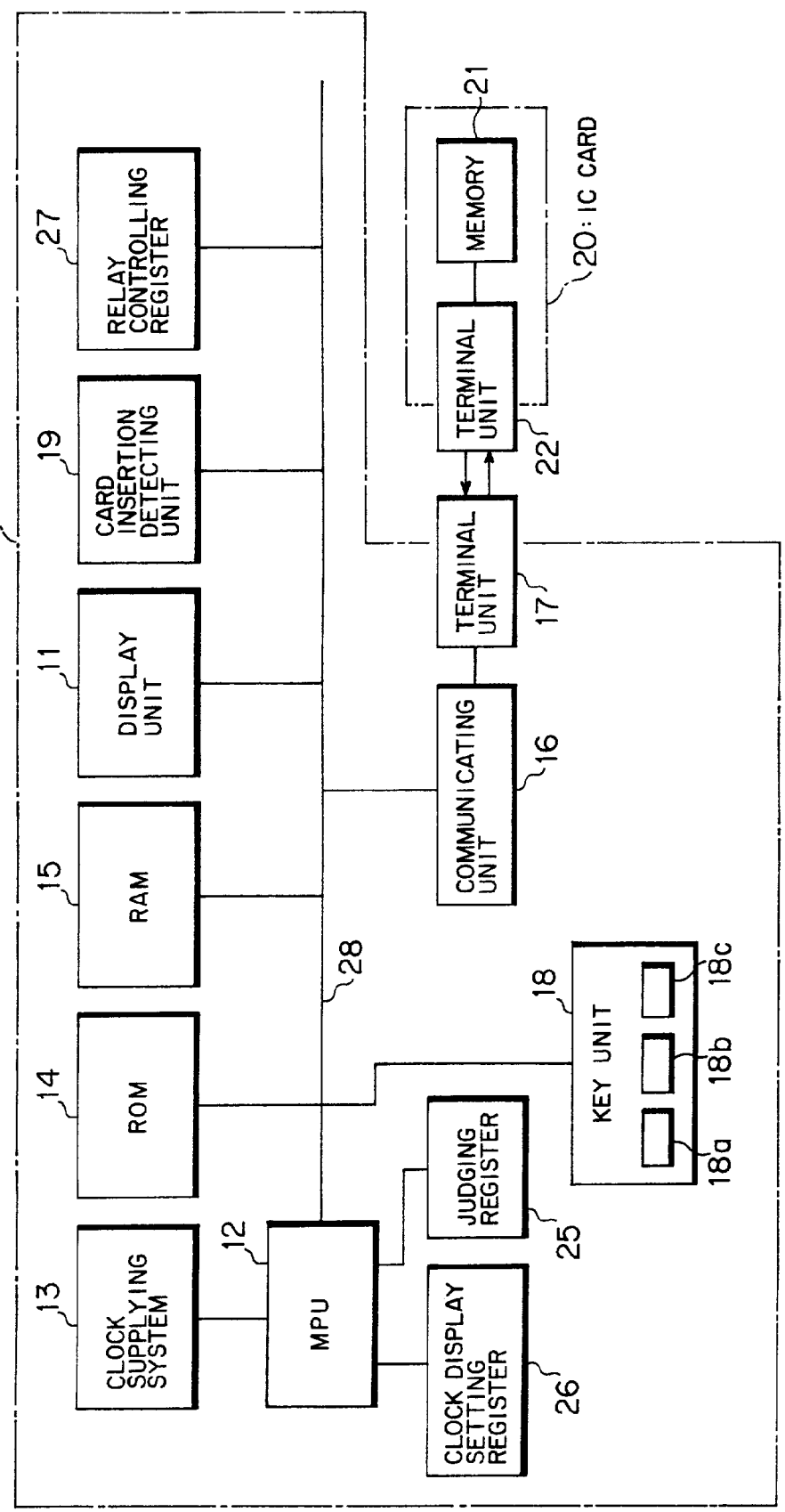
FIG. 3 is a block diagram showing a hardware structure of this embodiment.
Figure 4A:
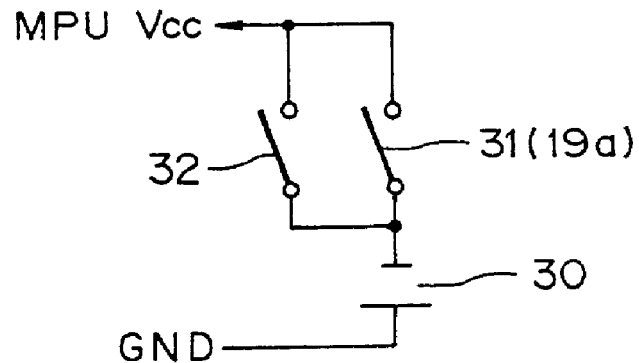
FIGS. 4(a) through 4(c) are circuit diagrams for illustrating a power supplying system and a state of switch installation according to the embodiment.
Figure 4B:
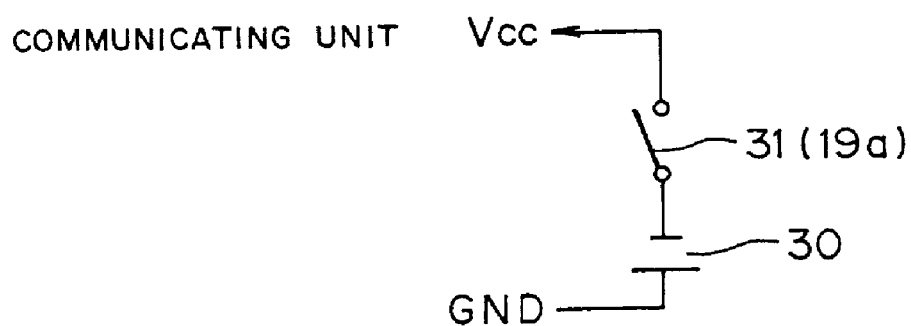
Figure 4C:
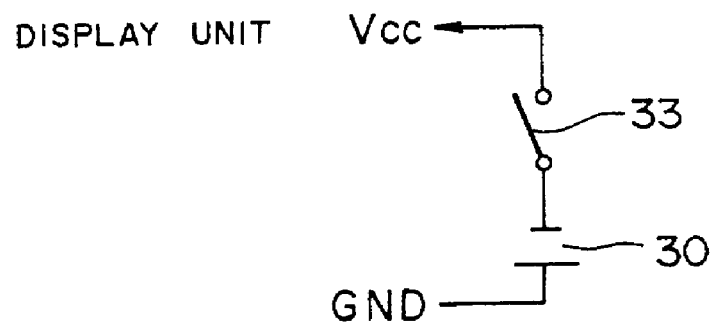

FIG. 3 is a block diagram showing a hardware structure of his embodiment, and FIGS. 4(a), 4(b) and 4(c) are circuit diagrams for illustrating a power supplying system and a state of switch installation of this embodiment. As shown in FIGS. 3 and 4(a) through 4(c), the IC card processing apparatus 10 according to this embodiment has, along with the above display unit 11, an MPU 12, a clock supplying system 13, a ROM 14, a RAM 15, a communicating unit 16, a terminal unit 17, the key unit 18, a card insertion detecting unit 19, a judging register 25, a clock display setting register 26, a relay controlling register 27, a bus 28, a battery 30, a power supplying switch 31, a relay switch 32 and a power supply instructing switch 33 for the display unit 11.

Here, the display unit 11, the MPU 12, the ROM 14, the RAM 15, the communicating unit 16, the key unit 18, the card insertion detecting unit 19 and the relay controlling register are connected to each other by the bus 28.

As shown in FIGS. 9, 12(b), 13 and 14, etc., the display unit 11 is configured as a display of, for example, liquid crystal which can display alphanumerical and Japanese kana characters in higher-order four digits and numerical characters in lower-order eight digits to display various information including data read out from the memory 21 of the IC card as will be described later.

The MPU (MicroPocessor Unit; control unit) 12 is operated with a clock fed from the clock supplying system 13 to collectively control operations of the IC card processing apparatus 10 of this embodiment. The MPU 12 conducts various controlling operations including a display state control on the display unit 11 and a read/write control on data stored in the memory 21 of the IC card 20 so as to realize various functions which will be described later with reference to FIGS. 7 through 33.

Figure 6:
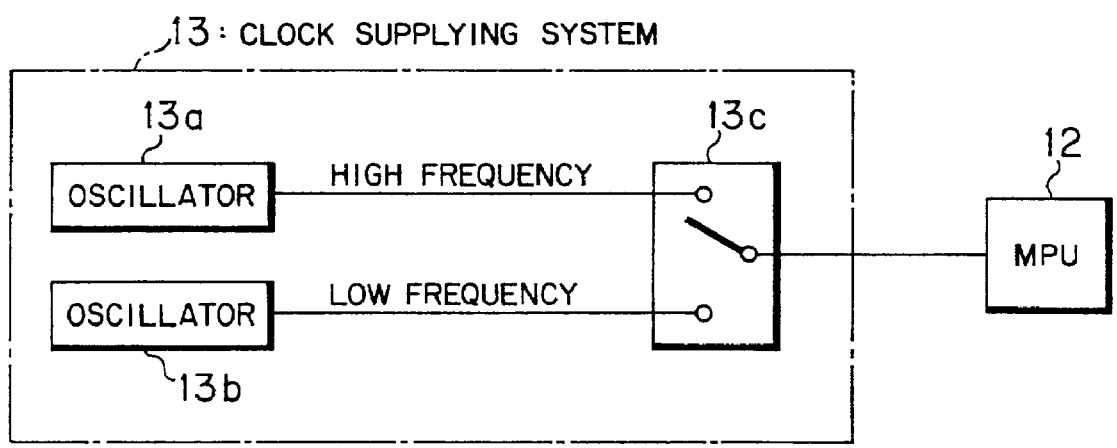
FIG. 6 is a block diagram showing a clock supplying system according to the embodiment.

The clock supplying system 13 of this embodiment has, as shown in FIG. 6, a high frequency clock oscillator 13a, a low frequency clock oscillator 13b and a switching circuit (switching register, switching unit) 13c.

The switching circuit 13c selectively switches to a clock supplied from either one of the oscillators 13a and 13b, and outputs the clock to the MPU 12. As will be described later in an item [L] about a low power consumption mode of the IC card processing apparatus 10 of this embodiment, the switching circuit 13c selects a clock fed from the oscillator 13a oscillating a clock in a high frequency in a state where the IC card 20 is inserted in the IC card processing apparatus 10 or when designated so by a program (software), and outputs the clock to the MPU 12. Otherwise, the switching circuit 13c selects a clock fed from the oscillator 13b oscillating a clock in a low frequency in a state where the IC card 20 is not inserted in the IC card processing apparatus 10 or when designated so by the program (software), and outputs the clock to the MPU 12.

The ROM 14 holds a program or the like used for controlling operations executed by the MPU 12. The RAM 15 is used as a work area or the like when the MPU 12 executes the controlling operations. The RAM 15 also functions as a memorandum information storing unit for storing memorandum information inputted according to presses of the keys 18a through 18c, as will be described later.

The communicating unit 16 has the terminal unit 17 contacting with a terminal unit 22 of the IC card 20 inserted into the IC card processing apparatus as shown in FIG. 2(b) to communicate with the IC card 20 (memory 21) via the terminal units 17 and 22.

The key unit 18 has three types of keys, that is, the select key (first key) 18a, the shift key (second key) 18b and the enter key (third key) 18c, pressed by a holder (operator) or the like of the IC card 20 to be operated in order to realize various functions, which will be described later with reference to FIGS. 7 through 33. By providing a port (I/O register; not shown) for reading contact information of these keys 18a through 19c on the bus 28 of the MPU 12, it is possible for the MPU 12 to read that each of the keys 18a through 18c is pressed.

According to this embodiment, presses of these keys 18a through 18c are detected by the program executed in the MPU 12. The MPU 12 selects a processing function to be performed on the IC cars 20 according a press of the select key 18a selects, by a press of the shift key 18b, detailed data relating to the function selected by the press of the select key 18a (for example, a display in selecting detailed information, alteration of numerical figures, etc.), and determine data selected by the presses of the select key 18a and the shift key 18b. Whereby, the MPU 12 can conduct a various function selecting process, a detailed information selecting/changing process and a determining process according to presses of the keys lea through 18c. According to this embodiment, there is provided only one shift key 18b. However, it is alternatively possible to provide two shift keys, which are used to change numerical figures in ascending order and in descending order, respectively.

As functions according to this embodiment selected by a press of the select key 18a and excuted by the MPU 12 as will be described later with reference to FIG. 7 (item [B]), there are the first to the seventh functions as below.

The first function: a numerical value information displaying function (numerical value information displaying function) of displacing numerical value data [balance information which electronic money (currency) information in this embodiment] stored in the memory 21 of the IC card 20 on the display 11. This function will be described later in detail in an item [C] with reference to FIGS. 8 through 10.

The second function: a credit transaction history displaying function of displaying a credit transaction history (credit log information) with respect to the IC card 20 on the display unit 11. This function will be described later in detail in an item [D] with reference to FIGS. 11 through 14.

The third function: a debit transaction history displaying function of displaying a debit transaction history (debit log information) with respect to the IC card 20 on the display unit 11. This function will be described in detail later in an item [E] with reference to FIGS. 15 and 16.

The fourth function: a status displaying/changing function of displaying a status (lock status, unlock status, lock-out status) of the IC card 20, besides being able to change the status of the IC card 20. This function will be described in detail later in an item [F] with reference to FIGS. 17 through 21.

The fifth function: a password changing function of changing a password of the IC card 20. This function will be described in detail later in an item [G] with reference to FIGS. 22 and 23.

The sixth function: a personal information writing/displaying/changing function (memorandum function) of writing personal information (name, personal number, telephone number, account number, etc.) in the memory 21 of the IC card 20, displaying the personal information stored in the memory 21 of the IC card 20 on the display unit 11, and being able to change the personal information in the memory 21 of the IC card 20. This function will be described in detail later in an item [H] with reference to FIGS. 24 through 26.

The seventh function: a clock display setting function of setting under a state where the IC card 20 is inserted in the IC card processing apparatus 10 whether a clock is displayed on the display unit 11 of the IC card processing apparatus 10 or not when the IC card 20 is not inserted. This function will be described in detail later in an item [I] with reference to FIGS. 27 and 28.

Figure 5B:
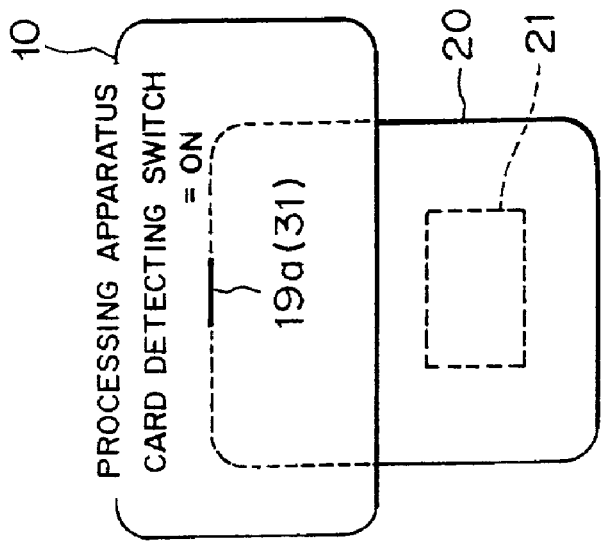
FIGS. 5(a) and 5(b) are schematic plan views for illustrating a structure and an operation of a card insertion detecting unit according to the embodiment.
Figure 5A:
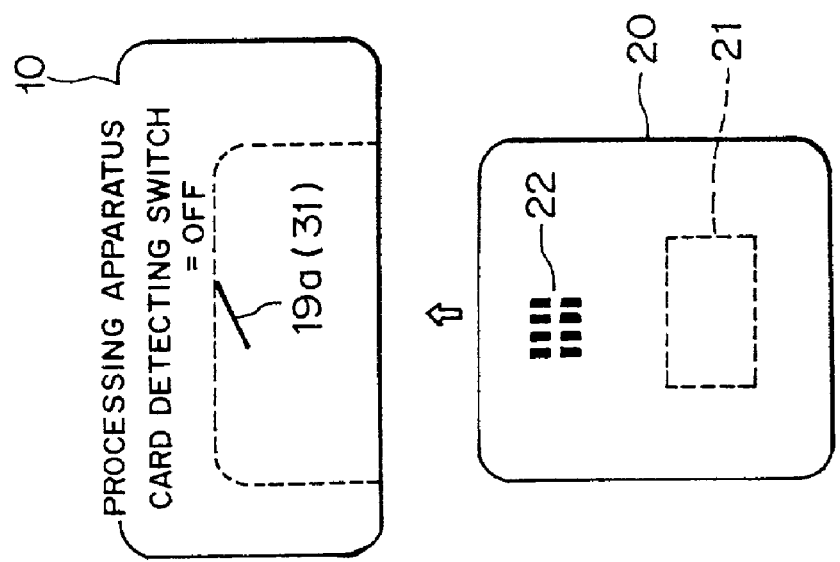

The card insertion detecting unit 19 detects whether the IC card 20 is inserted in the IC card processing apparatus 10 or not using a card detecting switch 19a [refer to FIGS. 5(a) and 5(b)]. The card detecting switch 19a is interlocked with insertion of the IC card 20 to be mechanically opened and closed. In a state where the IC card 20 is not inserted, the card detecting switch 19a is opened and held in an OFF-state, as shown in FIG. 5(a). On the other hand, in a state where the IC card 20 is inserted, the card detecting switch 19a is mechanically driven by the IC card 20 and held in an ON-state. In this embodiment, the card detecting switch 19a is also used as the power supplying switch 31 shown in FIGS. 4(a) through 4(c).

The judging register 25 and the clock display setting register 26 are provided to the MPU 12.

In the judging register 25, a reading-completion flag is set at each read information unit of data having been read out from the memory 21 of the IC card 20 by the MPU 12. The judging register 25 is used to shorten a time period required from when the IC card 20 is inserted into the IC card processing apparatus 10 to when the display unit 11 displays data, details of which will be described later in an item [J] with reference to FIGS. 29 and 30.

The clock display setting register 26 is set a flag thereat when it is set by the clock display setting function described in the above seventh item that the display unit 11 of the IC card processing apparatus 10 displays a clock. The MPU 12 refers to a state of setting of the flag in the register 26 when the IC card 20 is not inserted, thereby judging whether the display unit 11 of the IC card processing apparatus 10 displays the clock or not.

The relay controlling register 27 is set thereat a flag for setting ON/OFF of the relay switch 32 [refer to FIG. 4(a)] and the power supply instructing switch 33 [refer to FIG. 4(c)]. The MPU 12 refers to the setting of the flag in the relay controlling register 27 to drive the switches 32 and 33 to set the same ON/OFF. Owing to the setting of the flag in the relay controlling register 27, it is possible to realize functions performed when the IC card 20 is not inserted, which will be described later in an item [K], besides it is possible to set a low power consumption mode, which will be described later in an item [L].

The battery (power source unit) 30 supplies electric power to each part (the MPU 12, the communicating unit lo and the display unit 11) of the IC card processing unit 10 and the IC card 20, as shown in FIGS. 4(a) through 4(c). Basically, by closing the power supplying switch 31, electric power is supplied from the battery 30.

According to this embodiment, the power supplying switch 31 is also used as the card detecting switch 19a, as described hereinbefore. When the IC card 20 is inserted into the IC card processing apparatus 10, the power supplying switch 31 is mechanically switched to a close state (ON state), interlocked therewith.

It is alternatively possible that the power supplying switch 31 is provided separately from the card detecting switch 19a, and is manually operated by a holder or the like of the IC card 20. The power from the battery 30 is supplied to the IC card 20 via the terminal unit 17 connected to the communicating unit 16 and the terminal unit 22 of the IC card 20.

As shown in FIG. 4(a), the relay switch 32 is provided in parallel to the power supplying switch 31 in the power supplying system for supplying the power to the MPU 12. The relay switch 32 is driven by the MPU 12 to be switched ON/OFF according to the setting of the flag in the above-mentioned relay controlling register 27. It is therefore possible to arbitrarily set in the program (software) YES/NO of power supply to the MPU 12 when the IC card 20 is not inserted.

As shown in FIG. 4(b), there is disposed only the power supplying switch 31 in the power supplying system for the communicating unit 16. Namely, as will be described later in the item [L], the power supply to the communicating unit 16 is stopped when the IC card 20 is not inserted since the communicating unit 16 is not required to communicate at all.

Further, there is also disposed the power supply instructing switch 33 for the display unit 11 in the power supplying system for the displaying unit 11, as shown in FIG. 4(c). The power supply instructing switch 33 is driven by the MPU 12 to be switched ON/OFF according to the setting of the flag in the above-mentioned relay controlling register 27, similarly to the relay switch 32. It is therefore possible to arbitrarily set YES/NO of power supply to the display unit 11 in the program by using the power supply instructing switch 33 and the relay controlling register 27.

The IC card processing apparatus 10 according to this embodiment has original functions using the display unit 11 performed when the IC card 20 is not inserted, that is, a memorandum function of storing memorandum information in the RAM 15 (memorandum information storing unit) according to presses of the keys 18a through 18c and displaying the memorandum information stored in the RAM 15 on the display unit 11, in addition to the above-mentioned clock displaying function (function of displaying time or the like on the display unit 11 by the MPU 12). Incidentally, functions of the IC card processing apparatus 10 performed when the IC card 20 is not inserted will be described later in the item [K] with reference to FIGS. 31 and 32.

Next, operations of the IC card processing apparatus 10 with the above structure will be described with reference to FIGS. 7 through 33.

[B] Description of a function selecting-displaying procedure

A function selecting-displaying procedure, that is, a function of the select key 18a in the IC card processing apparatus 10 according to this embodiment will be described with reference to a flowchart (Steps S1 through S16) shown in FIG. 7.

Figure 7:
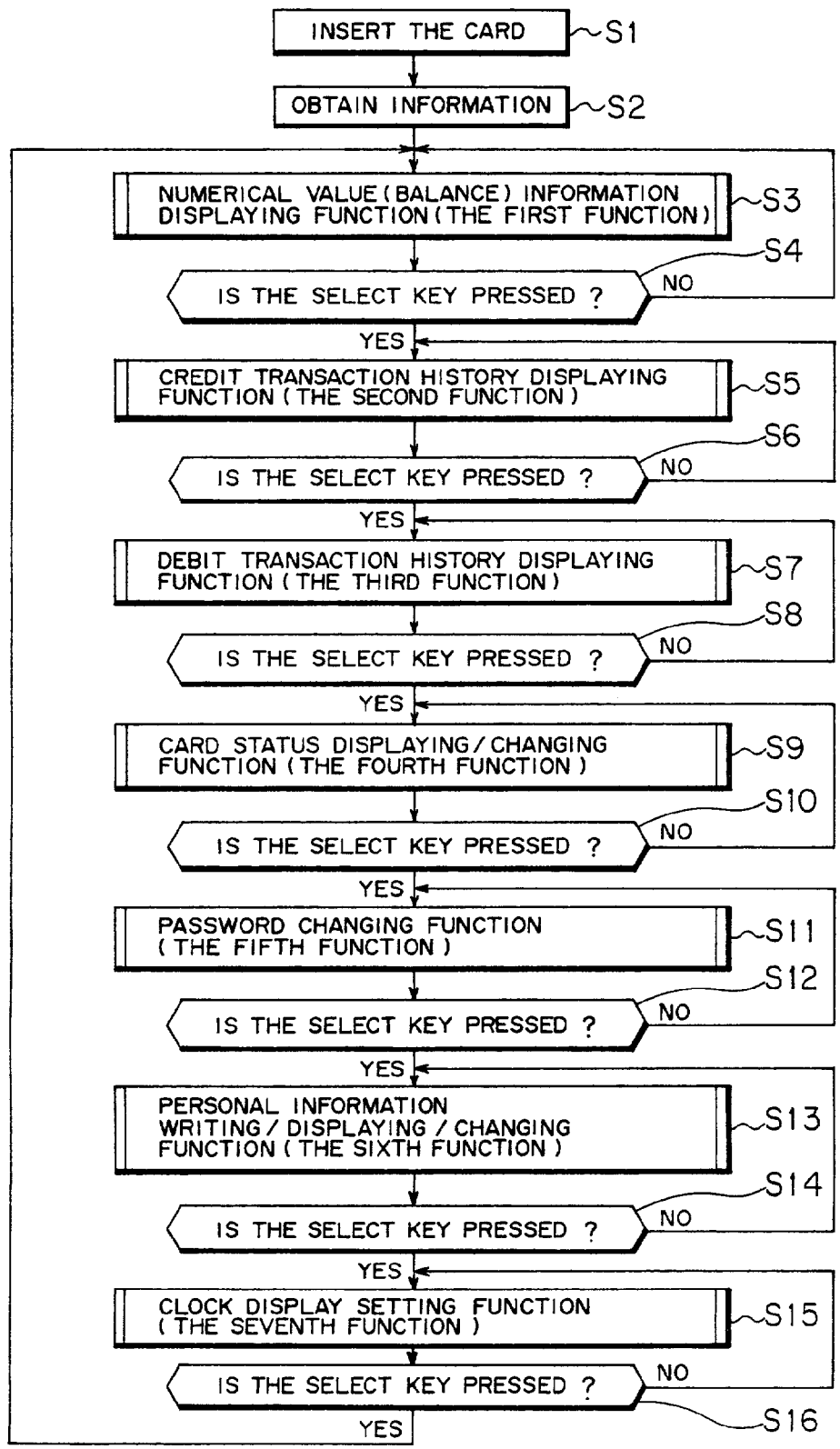
FIG. 7 is a flowchart for illustrating an operation (procedure for selecting-displaying functions) according to the embodiment.

As shown in FIG. 7, when the IC card 20 is inserted into the IC card processing apparatus 10 (Step S1), the MPU 12 reads various data from the memory 21 of the IC card 20 via the terminal units 17 and 22 using the communicating unit 16 to obtain information (Step S2).

When obtaining the information from the IC card 20, the MPU 12 executes the numerical value (balance) information displaying function (the first function) to display an initial display (display an initial screen) of the numerical value (balance) information displaying function on the display unit 11 (Step S3). When the select key 18a is pressed in a state of the initial display (YES route at Step S4), the MPU 12 executes the credit transaction history displaying function (the second function), and displays the initial display of the credit transaction displaying function on the display unit 11 (Step S5).

Similarly, when the select key 18a is pressed in a state of the initial display of the second function (YES route at Step S6), the MPU 12 executes the debit transaction history displaying function (the third function), and displays the initial display of the debit transaction displaying function on the display unit 11 (Step S7). When the select key 18*a* is pressed in a state of the initial display (YES route at Step S8), the MPU 12 executes the card status displaying/changing function (the fourth function) to display the initial display of the card status displaying/changing function on the display unit 11 (Step S9).

When the select key 18*a* is pressed in a state of the initial display of the fourth function (YES route at Step S10), the MPUJ 12 executes the password changing function (the fifth function), and displays the initial display of the password changing function on the display unit 11 (Step S11). When the select key 18*a* is pressed in a state of the initial display (YES route at Step S12), the MPU 12 executes the personal information writing/displaying/changing function (the sixth function), and displays the initial display of the personal information writing/displaying/changing function on the display unit 11 (Step S13).

When the select key 18*a* is pressed in a state of the initial display of the sixth function (YES route at Step S14), the MPU 12 executes the clock display setting function (the seventh function), and displays the initial display of the clock display setting function on the display unit 11 (Step S15). When the select key 18*a* is pressed in a state of the initial display (YES route at Step S16), the procedure returns to Step S1, at which the MPU 12 displays the initial display of the numerical value (balance) information displaying function, which is the first function, on the display unit 11.

The initial displays of the plural functions are successively switched cyclically on the display 11 by pressing the select key 18*a* so that the operator can arbitrarily select a function among the plural functions.

Meanwhile, the select key 18*a* functions similarly to a delete key when pressed during execution of any one of the first to the seventh functions before that function is terminated. Namely, when the select key 18*a* is pressed while a selected function is executed, the MPU 12 cancels a process being now executed, and displays the initial display of the function being now executed on the display unit 11, or selects the next function and displays the initial display of that function on the display unit 11.

Figure 8:
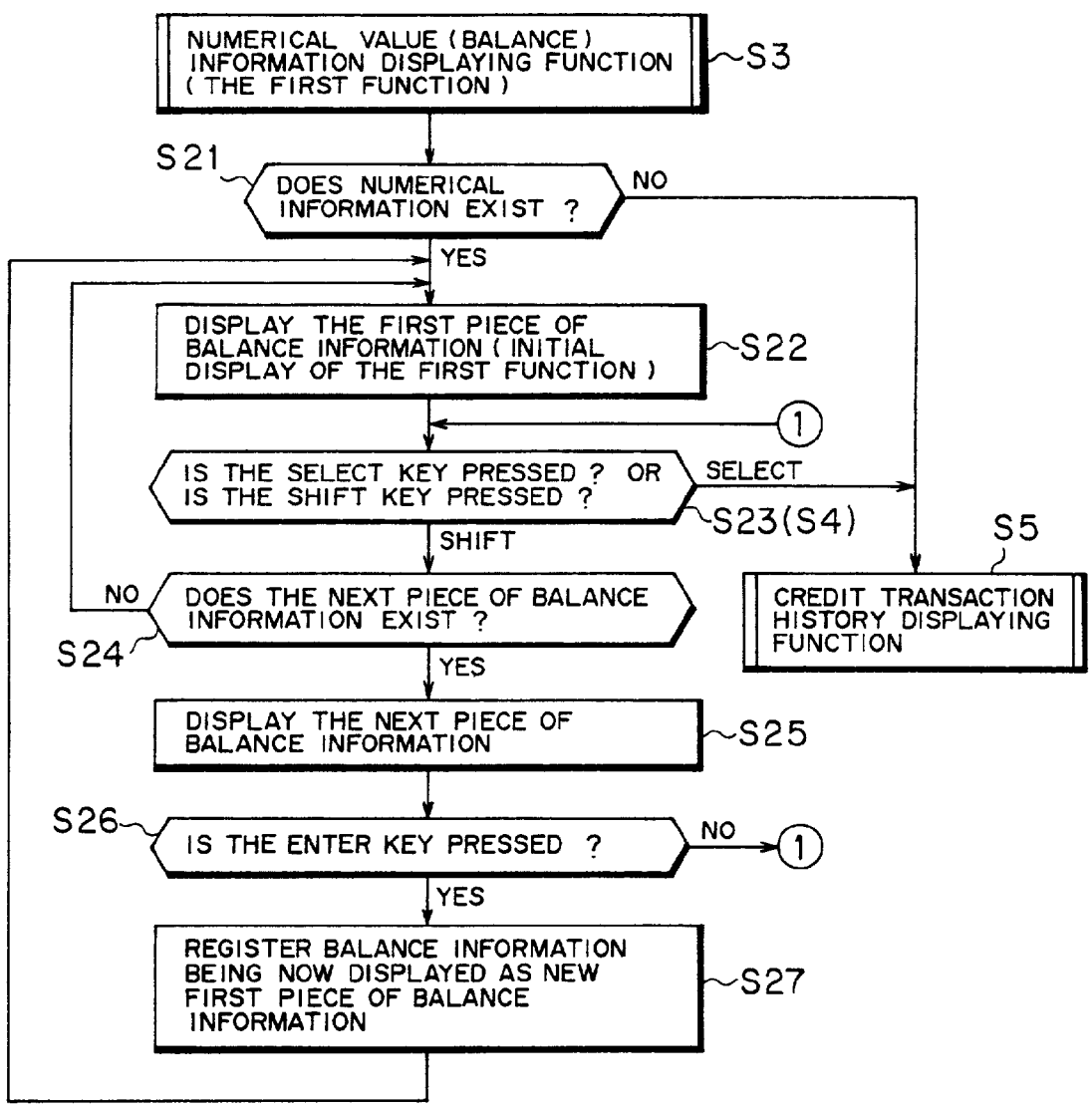
FIG. 8 is a flowchart for illustrating a numerical value (balance) information displaying function according to the embodiment.

[C] Description of the numerical value (balance) information displaying function Next, the numerical value (balance) informtion displaying function (the first function) of the IC card processing apparatus 10 of this embodiment will be described with reference to a flowchart (Steps S21 through S27) shown in FIG. 8, and FIGS. 9(*a*), 9(*b*), 10(*a*) and 10(*b*).

According to the numerical value (balance) information displaying function (Step S3), which is the first function of this embodiment, if numerical value information (balance information) exists in the information obtained from the IC card 20 at Step S2 in FIG. 7 (YES route at Step S21), the MPU 12 displays the first piece of information in the numerical information, that is, the first piece of balance information, as the initial display on the display unit 11 (Step S22). If the numerical information does not exist (NO route at Step S21), the procedure proceeds to the credit transaction history displaying function (Step S5), which is the next function. In FIG. 7, a process of judging whether the numerical value information exists or not at Step S21 is not shown.

If plural pieces of electronic money information (currency information) are stored as the value information in the memory 21 of the IC card 20 as shown in FIG. 9(*a*), for example, the MPU 12 displays a balance in the first block (default pocket No. 00) on the display unit 11. In an example shown in FIG. 9(*a*), balance information of 100, 50000 and 1000 in three kinds of currency, that is, U.S. dollar (US$), Japanese Yen (JP¥) and sterling pound (GBP), are stored in pockets No. 00, No. 01 and No. 02, respectively. As shown in FIG. 9(*b*), "US$ 100" is displayed as the initial display (the first display) of the numerical value (balance) information displaying function on the display unit 11.

If the select key 18*a* is pressed during the initial display ["SELECT" route at Step S23 (S4)], the procedure proceeds to the credit transaction history displaying function (Step S5), which is the next function.

If the shift key 18*b* is pressed during the initial display ("SHIFT" route at Step S23) and the next piece of balance information exists (information in the second and the following blocks) (YES route at Step S24), the MPU 12 displays balance information in the second block (pocket No. 01) and the succeeding blocks (Step S25). If the enter key 18*c* is not pressed during the display of the balance information (NO route at Step S26), the procedure returns to Step S23, at which the same process is repeated.

When the last piece of balance information is displayed (NO route at Step S24), the procedure returns to Step S22, at which the first piece of balance information is displayed. If the select key 18*a* is pressed while each piece of various balance information is displayed ["SELECT" route at Step S23 (S4)], the procedure immediately returns to the credit transaction history displaying function (Step S5).

If balance information as shown in FIG. 9(*a*) is stored in the memory 21 of the IC card 20, each time the shift key 18*b* is pressed during the first display "US$ 100", the second display "JP¥ 50,000" and the third display "BGP 1,000" are displayed successively. When the shift key 18*b* is pressed three times, the display returns to the first display "US$ 100".

The numerical value (balance) information displaying function can change contents of the display on the display unit 11, and display successively and cyclically plural pieces of balance information by pressing the shift key 18*b*, as above.

When the enter key 18*c* is pressed while balance information other than the first piece of balance information (US$ 100) is displayed on the display unit 11 (YES route at Step S26), the balance information display at that time is registered in the memory 21 of the IC card 20 as a new piece of first balance information, and stored in the first block (pocket No. 00)(Step S27).

Figures 9A, 9B:
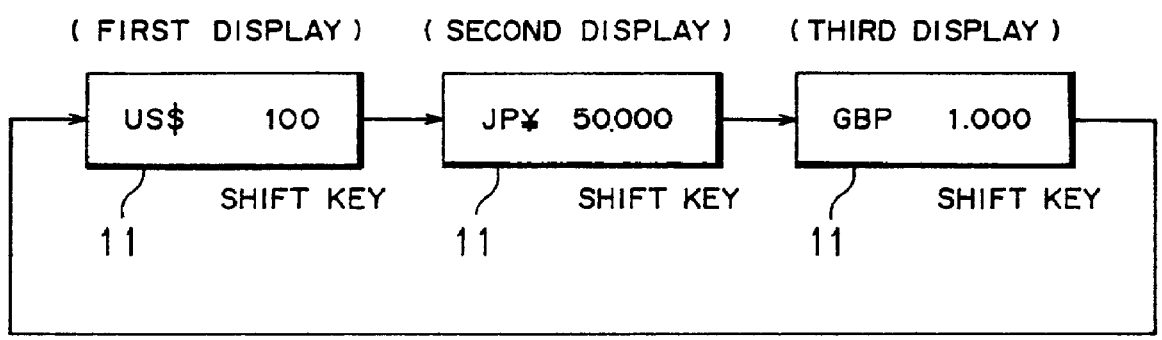
Figure 10:
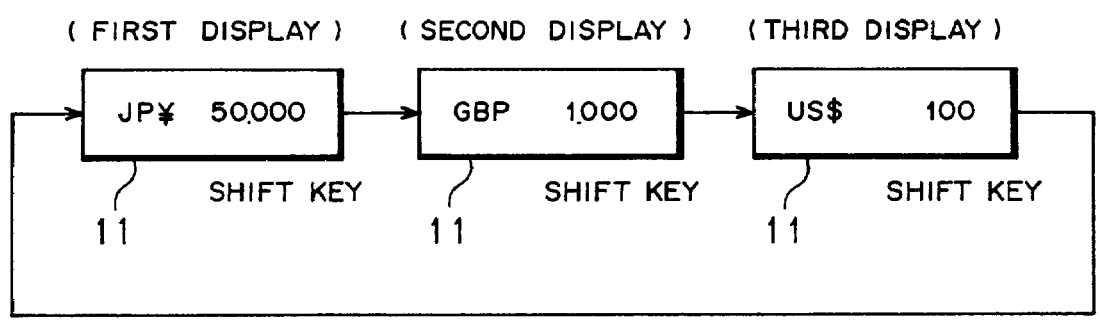
Figure 11:
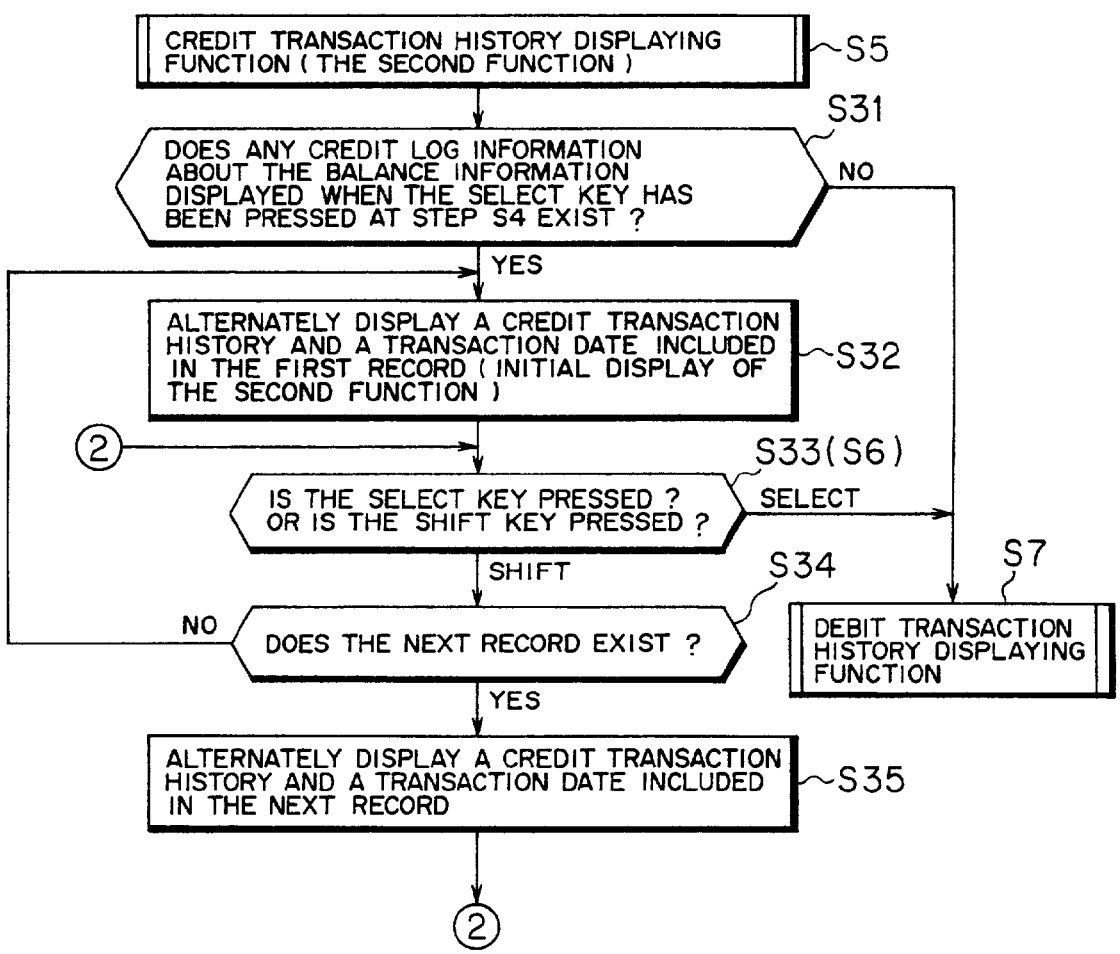
FIG. 11 is a flowchart for illustrating a credit transaction history displaying function according to the embodiment.

When the enter key 18*c* is pressed while the second display "JP¥ 50,000" is displayed as shown in FIG. 9(*b*), for example, the MPU 12 issues a command to the IC card 20 so that JP¥ 50,000 in the second block (pocket No. 01) is stored in the pocket No. 00, besides "GBP 1,000" and "US$ 100" are stored in the pockets No. 01 and No. 02, respectively, as shown in FIG. 10(*a*). After that, "JPY¥ 50,000" is displayed as the first display, and "GBP 1,000" and "US$ 100" are successively displayed each time the shift key 18*b* is pressed, as shown in FIG. 10(*b*).

As above, it is possible to set the first display (initial display) obtained when the numerical value (balance) information displaying function is selected to which the operator or the like of the IC card 20 desires by pressing the enter key 18*c* while the numerical value (balance) information displaying function is executed.

This embodiment is described by way of an example where the numerical value information is balances of three kinds of currency. However, the present invention is not limited to this example. Alternatively, the numerical value information may be points or the like used in a shopping district, or the pockets may be in any number.

[D] Description of the credit transaction history displaying function

Next, the credit transaction history displaying function (the second function) of the IC card processing apparatus 10 according to this embodiment will be described with reference to a flowchart (Steps S31 through S35) shown in FIG. 11, and FIGS. 12 through 14.

According to the credit transaction history displaying function (Step S5), which is the second function of this embodiment, if credit log information (transaction history) about the balance information displayed on the display unit 11 when the select key 18a is pressed at Step S23 (S4) is included in the information obtained from the IC card 20 at Step S2 in FIG. 7 (YES route at Step S31), the MPU 12 displays the first piece of information in the credit log information, that is, the first piece of credit transaction information, as the initial display on the display unit 11 (Step S32). If the credit log information does not exist (NO route at Step S31), the procedure proceeds to the debit transaction history displaying function (Step S7), which is the next function. Incidentally, a process of judging whether the credit log information exists or not at Step S31 is not shown.

Figures 12A, 12B:
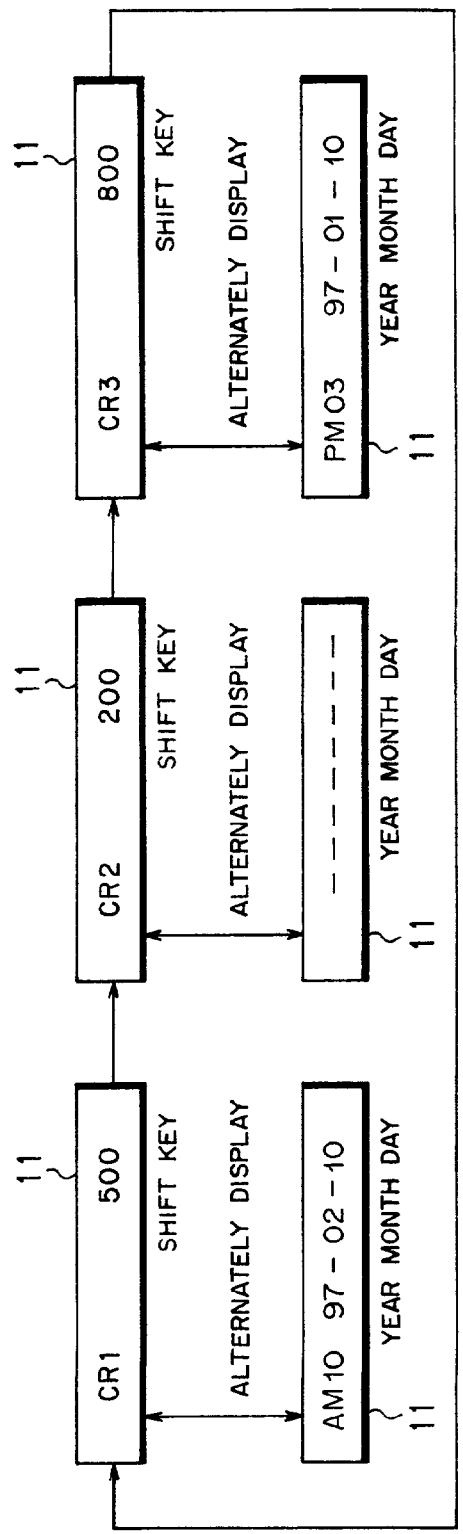

If credit logs of plural kinds of electronic money (currency) are stored as the credit log information in the memory 21 of the IC card 20 as shown in FIG. 12(a), the MPU 12 displays the first ciredit log of currency displayed on the display unit 11 when the credit transaction history displaying function is selected.

When the select key 18a is pressed while the second display "JP¥ 50,000" is displayed as shown in FIG. 9(b), for example, the first credit log of Japanese Yen, that is, log information in the first record (No. 00) in a log file here, is displayed on the display unit 11, as shown in FIG. 12(b). Namely, "CR" (Credit Record) representing that a type of transaction is credit transaction, a history number "1" and a credit amount (transaction value) "500" are displayed as an initial display (the second display) of the credit transaction history displaying function on the display unit 11. A type of transaction, a history number and a credit amount as above, and a transaction date/time "AM10 97-02-10" are alternately displayed at constant intervals on the display unit 11.

When the select key 18a is pressed during the initial display ["SELECT" route at Step S33 (S6)], the procedure proceeds to the debit transaction history displaying function (Step S7), which is the next function, as described before with reference to FIG. 7.

If the shift key 18b is pressed during the initial display ("SHIFT" route at Step S33) and if the next credit log information exists (YES route at Step S34), the next piece of credit log information is displayed (Step S35), the procedure then returns to Step S33, at which the same process is repeated.

When the last piece of credit log information is displayed (NO route at Step S34), the procedure returns to Step S32, at which the first piece of credit log information is displayed. When the select key 18a is pressed while each piece of the credit log information is displayed ["SELECT" route at Step S33 (S6)], the procedure immediately shifts to the debit transaction history displaying function (Step S7).

If credit log information as shown in FIG. 12(a) is stored in the memory 21 of the IC CARD 20, the first display state where "CR1 500" and "AM10 97-02-10" are alternately displayed is changed to the second display state where "CR2 200" and "--------" are alternately displayed, then to the third display state where "CR3 800" and "PM03 97-01-10" are alternately displayed each time the shift key 18b is pressed. When the shift key 18b is pressed three times, the display returns to the first display state.

If no transaction date/time is recorded ["00.00.00.00" in FIG. 12(a)], the transaction date/time is displayed as "--------" on the display, as shown in FIG. 12(b). When two or more pieces of credit log information are successively changed to be displayed as shown in FIG. 12(b), the credit log information is displayed in order of time from the latest one (or the oldest one) on the display 11.

According to the credit transaction history displaying function, it is possible to change contents of the display on the display unit 11 and display plural pieces of credit log information successively and cyclically by pressing the shift key 18b, as above.

When the transaction date/time is displayed, an arrangement of the transaction date/time and contents of the display can be changed according to the contents to be displayed (type of currency, here).

For instance, since date is generally described in an order of date, month and year in America, when the holder or the like of the IC card 20 selects the credit transaction history displaying function (if credit log information of a balance in U.S. dollar is displayed) by pressing the select key 18a while a balance in U.S. dollar is displayed using the numerical value (balance) information displaying function, an order of displaying transaction date/time is changed as shown in FIG. 13, and displayed on the display unit 11.

In Japan, a date is generally described in an order of year, month and date. Accordingly, when credit log information of a balance in Japanese Yen is displayed, the date is displayed in the order shown in FIG. 12 (b).

A date is displayed in the American style to a person using mainly U.S. dollar as currency, whereas a date is displayed in the Japanese style to a person using mainly Japanese Yen as currency, as above. It is therefore possible to realize a display of a date most suitable for a holder of the IC card 20.

Further, if there are n pieces of credit log information, final history display information "END" representing that all credit log information has been displayed is displayed on the display unit 11 after the n-the (the last) piece of the credit log information is displayed on the display unit 11 by pressing the shift key 18b, as shown in FIG. 14, for example. Whereby, it is possible to clearly report that all credit log information has been displayed to a person referring the information.

[E] Description of the debit transaction history displaying function

Figure 15:
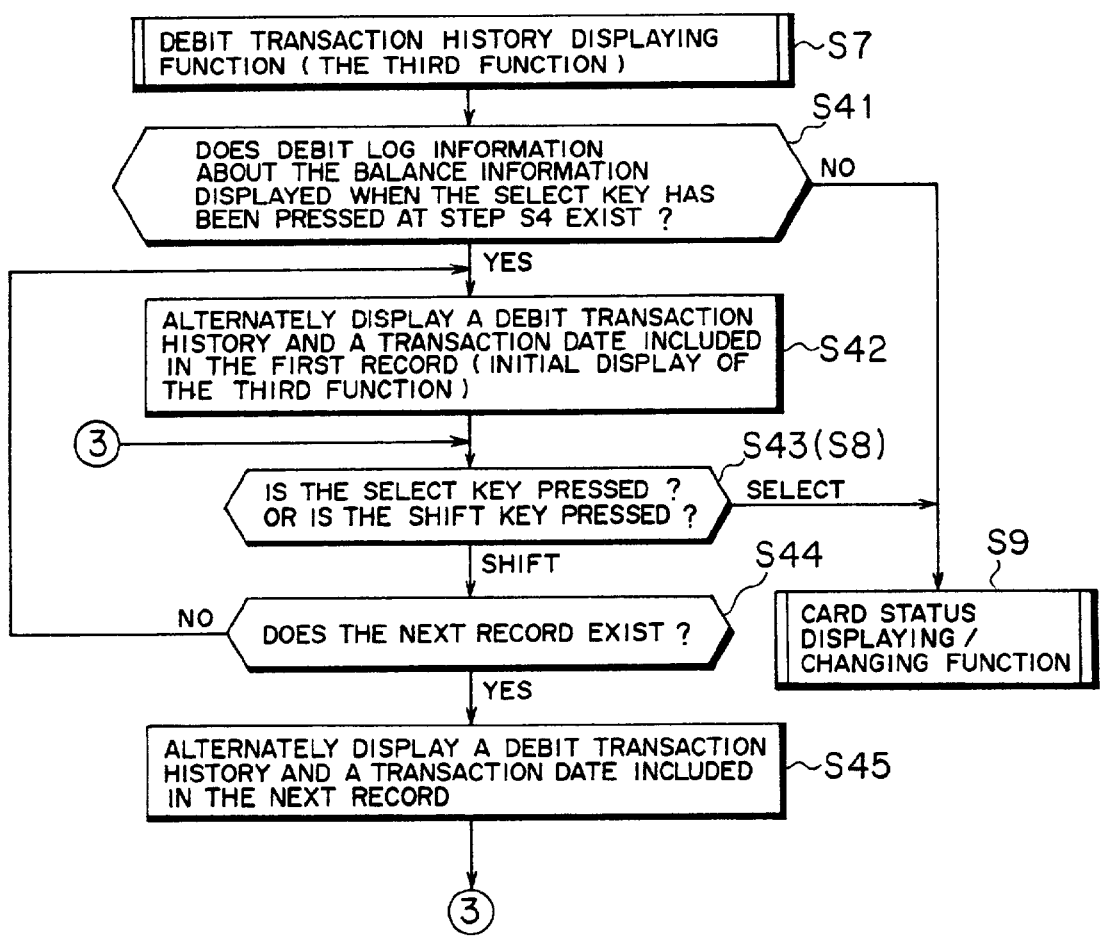
FIG. 15 is a flowchart for illustrating a debit transaction history displaying function according to the embodiment.

Next, the debit transaction history displaying function (the third function) of the IC card processing apparatus 10 of this embodiment will be described with reference to a flowchart (Step S41 through S45) shown in FIG. 15, and FIG. 16.

Figure 16:
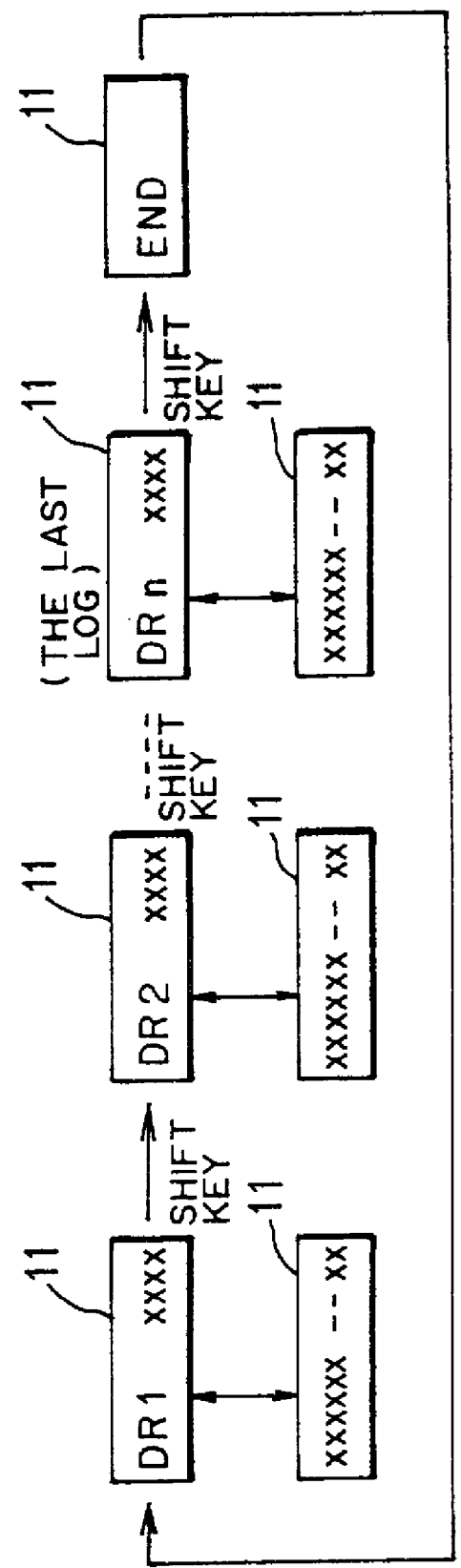
FIG. 16 is a diagram for illustrating the display state of debit log information.

The debit transaction history displaying function (Step S7), which is the third function according to this embodiment, is performed similarly to the credit transaction history displaying function described hereinbefore, as will be described later, excepting that a type of transaction displayed on the display unit 11 is "DR" (Debit Record) representing debit transaction, as shown in FIG. 16.

According to the debit transaction history displaying function, if debit log information (transaction history) about balance information displayed on the display unit 11 when the select key 18a is pressed at Step S23 (S4) is included in the information obtained from the IC card 20 at Step S2 in FIG. 7 (YES route at Step S41), the first piece of information in the debit log information, that is, the first piece of debit transaction information, is displayed as the initial display on the display unit 11 (Step S42), as well.

At this time, a type of transaction (DR), a history number, a debit amount and a date/time of the transaction are alternately displayed at constant intervals as the debit transaction information on the display unit 11, as shown in FIG. 16. If no debit log information exists (NO route at Step S41), the procedure proceeds to the card status displaying/changing function (Step S9), which is the next function. Incidentally, a process of judging whether the debit log information exists or not at Step S41 is not shown in FIG. 17.

If debit logs of plural kinds of electronic money (currency) are stored as the debit log information in the memory 21 of the IC card 20, the first debit log of currency displayed on the display unit 11 when the credit transaction history displaying function is selected is displayed as the initial display on the display unit 11.

When the select key 18a is pressed during the initial display ["SELECT" route at Step S43 (S8)] the procedure proceeds to the card status displaying/changing function (Step S9), which is the next function, as described before with reference to FIG. 7.

If the shift key 18b is pressed during the initial display ("SHIFT" route at Step S43) and there is the next piece of debit log information (YES route at Step S44), the next piece of debit log information is successively displayed (Step S45). After that, the procedure returns to Step S43, at which the same process is repeated.

When the last piece of debit log information is displayed (NO route at Step S44), the procedure returns to Step S42, at which the first piece of debit log information is displayed. When the select key 18a is pressed while each piece of debit log information is displayed ["SELECT" route at Step S43 (S8)], the procedure immediately proceeds to the card status displaying/changing function (Step S9).

If n pieces of debit log information exist as shown in FIG. 14, for example, a type of transaction (DR), a history number, a debit amount and a date/time of the transaction are successively changed to be alternately displayed each time the shift key 18b is pressed. After the n-th (the last) piece of the debit log information is displayed on the display unit 11, the final history display information "END" representing that all debit log information has been displayed is displayed on the display unit 11, then the procedure returns to the first display state.

If no transaction date/time is recorded, the transaction date/time is displayed as "--------" as shown in FIG. 12(b), similarly to the case of the credit transaction history displaying function. If two or more pieces of debit log information are successively changed to be displayed, the debit log information is displayed in order of time from the latest one (or the oldest one) on the display unit 11.

According to the debit transaction history displaying function, it is possible to change contents of the display on the display unit 11 to successively and cyclically display plural pieces of debit log information by pressing the shift key 18b.

Similarly to the credit transaction history displaying function, it is possible to change an arrangement of transaction date/time and contents of the display according to the contents to be displayed (type; a type of currency, here) when the transaction date/time is displayed so as to realize a display of a date most suitable for a holder of the IC card 20.

[F] Description of the card status displaying/changing function

Next, the card status displaying/changing function (the fourth function) of the IC card processing apparatus according to this embodiment will be described with reference to a flowchart (Steps S51 through S61) shown in FIG. 17, a flowchart (Steps S62 through S72) shown in FIG. 18, and FIGS. 19 through 21.

According to the card status displaying/changing function (Step S9), which is the fourth function of this embodiment, a current status of the IC card 20 is displayed as the initial display on the display unit 11 (Step S51). The card status is confirmed by reading a card status from the IC card 20.

Figure 19A:
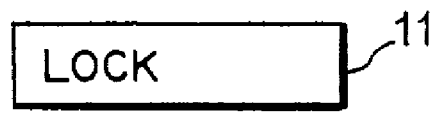
FIGS. 19(a) through 19(c) are diagrams showing examples of displays of card status according to the embodiment.
Figure 19B:
Figure 19C:

There are three kinds of card status, that is, lock, unlock and lock-out. Examples of these kinds of card status are shown in FIGS. 19(a) through 19(c), respectively.

In the lock status, the IC card 20 cannot be used at present but the lock status can be changed to the unlock status (usable status) by inputting/collating a password. If the IC card 20 is in the lock status, "LOCK" is displayed on the display unit 11 as shown in FIG. 19(a), for example.

In the unlock status, the IC card 20 can be used. If the card status is unlock, "UNLK" is displayed on the display unit 11 as shown in FIG. 19(b), for example.

In the lock-out status, the IC card 20 is unusable because of an error in inputting the password, an unlawful use, etc. Only the privileged person can change/cancel this status. If the card status is lock-out, "LOUT" is displayed on the display unit 11 as shown in FIG. 19(c), for example.

If the card status is lock-out ("LOUT" route at Step S52), a process conduced on the IC card 20 is forcibly terminated (Step S53). Namely, it is impossible to obtain various information from the memory 21 of the IC card 20 in the lock-out status. Accordingly, the procedure proceeds from Step S1 in FIG. 7 to Step S51 in FIG. 17. The MPU 12 then terminates the process after "LOUT" representing that the IC card 20 is in the lock-out status is displayed on the display unit 11.

If the IC card 20 is in the lock status ("LOCK" route at Step S52) and the select key 18a is pressed while "LOCK" is displayed ["SELECT" route at Step S54 (S10)], the procedure proceeds to the password changing function (Step S11), which is the next function, as described before with reference to FIG. 7.

Figure 20:
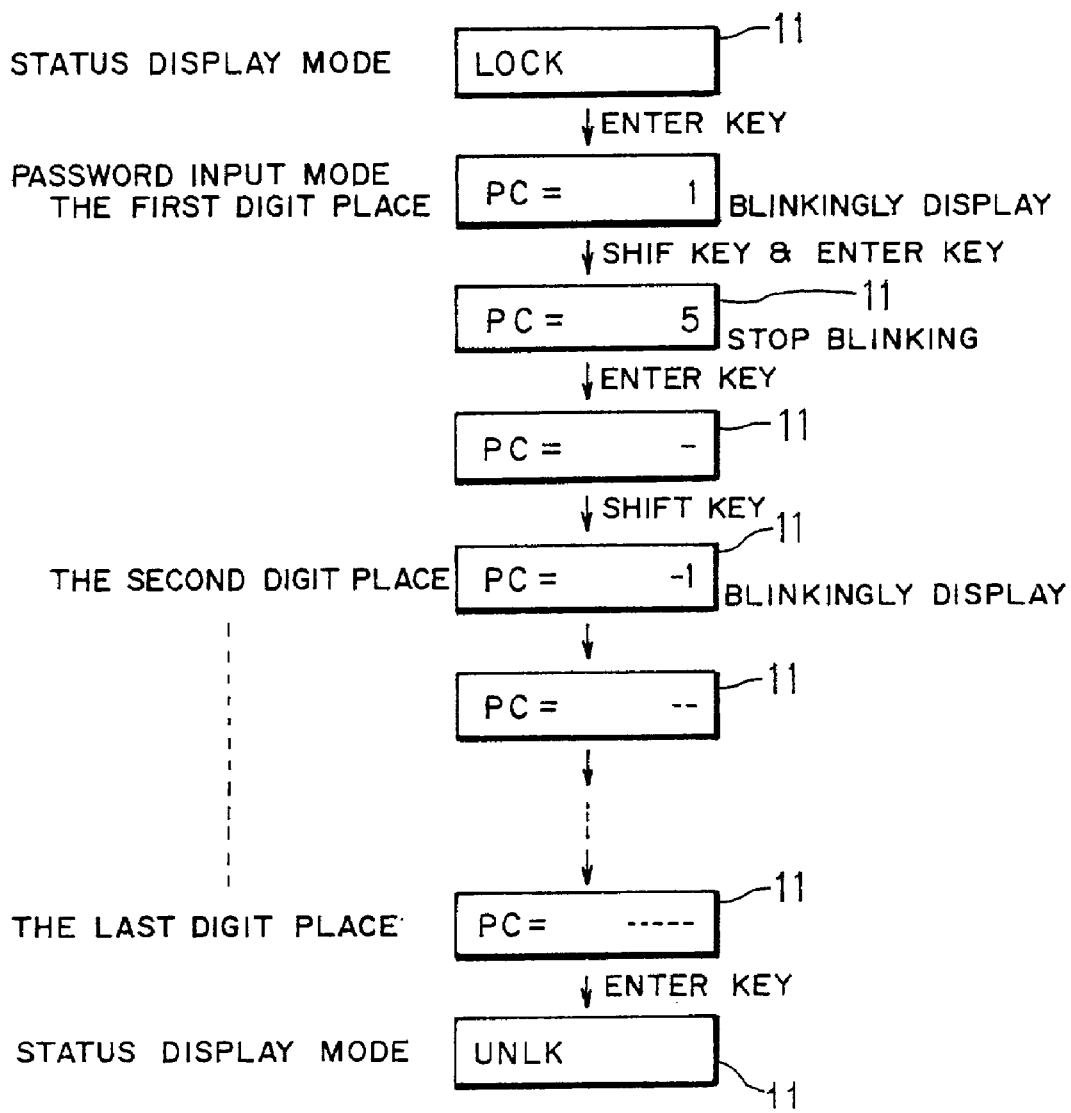
FIG. 20 is a diagram concretely showing a card status changing procedure (procedure for changing from lock status to unlock status) and a display state at that time according to the embodiment.

When the enter key 18c is pressed while "LOCK" is displayed ("ENTER" route at Step S54) as shown in FIG. 20, for example, a procedure proceeds to a process of changing the IC card 20 from the lock status to the unlock status(Steps S55 through S57). In order to change the status of the IC card 20 from the lock status to the unlock status, it is necessary to input a password unique to the IC card 20 stored in the IC card 20 to collate the same. According to this embodiment, inputting the password is accomplished by pressing the two kinds of keys, the shift key 18b and the enter key 18c.

When the enter key 18c is pressed while "LOCK" is displayed so that the IC card 20 shifts into a password input mode (Step S55; Steps S62 through S72 in FIG. 18), a default value in the first digit place is blinkingly displayed (blinked) on the display unit 11 (Step S62). When the shift key 18b is pressed in this state ("SHIFT" route at Step S63), a numerical value in the first digit place is changed according to a press of the shift key 18b and blinkingly displayed (Step S64).

When the enter key 18c is pressed ("ENTER" route at Step S63), a numerical value displayed when the enter key 18c is pressed is displayed without blinking (Step S65). When the shift key 18b is pressed in this state ("SHIFT" route at Step S66) the display of the numerical value is again blinked (Step S67), where the numerical value can be changed by pressing the shift key 18b. To the contrary, when the enter key 18c is again pressed after the blinking is stopped at Step S65 ("ENTER" route at Step S66) the numerical value in the first digit place is determined (Step S68).

When the shift key 18b is pressed after that ("SHIFT" route at Step S69), a default value in the next digit place is blinkingly displayed (Step S70), then the procedure returns to Step S63. Processes at Steps S63 through S70 are repeatedly executed until a numerical value in the last digit place is determined.

When the numerical value in the last digit place is determined and the enter key 18c is pressed ("ENTER" route at Step S69), the password is determined (completion of the password inputting; Step S71).

Figure 17:
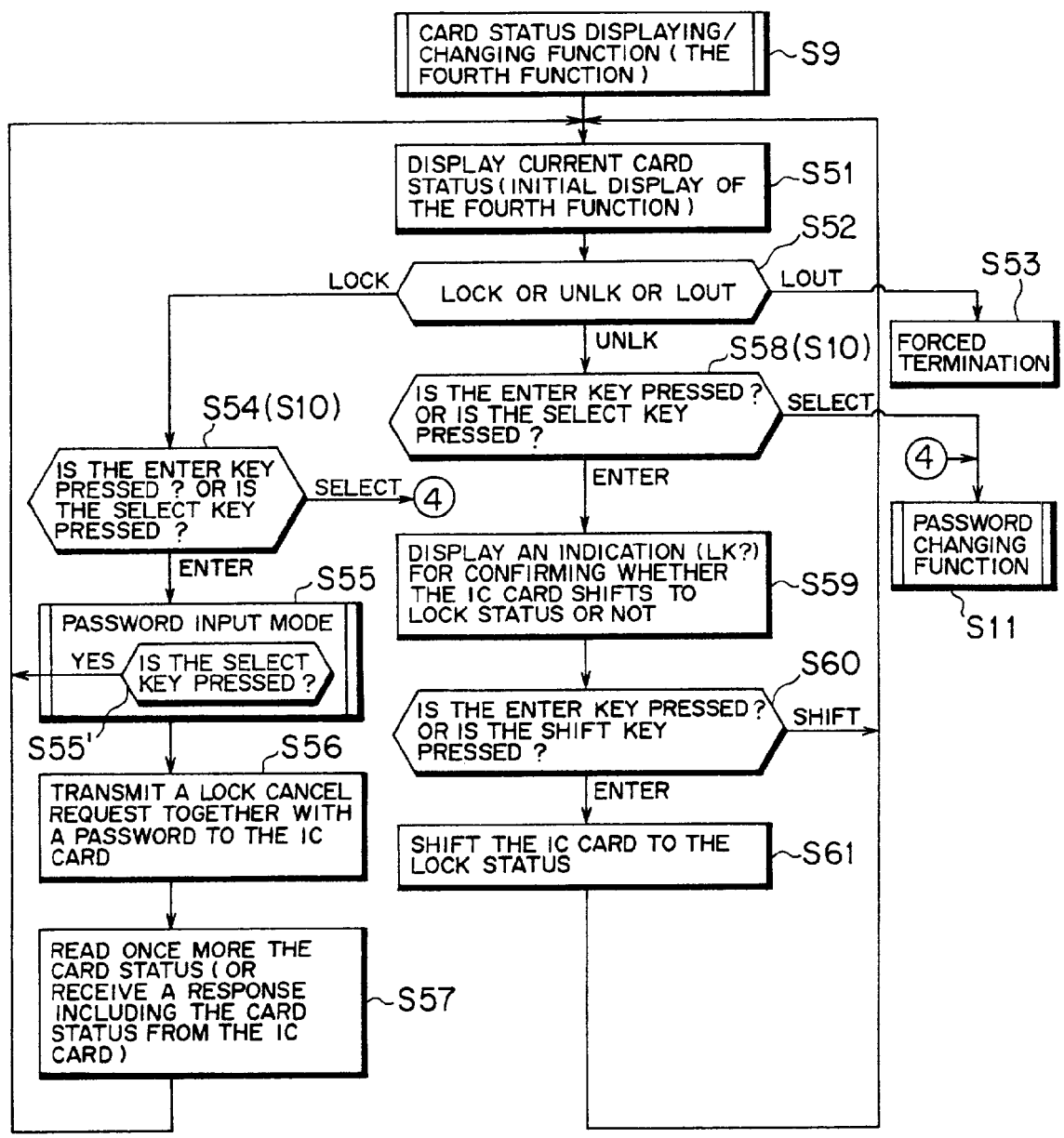
FIG. 17 is a flowchart for illustrating a card status displaying/changing function according to the embodiment.
Figure 18:
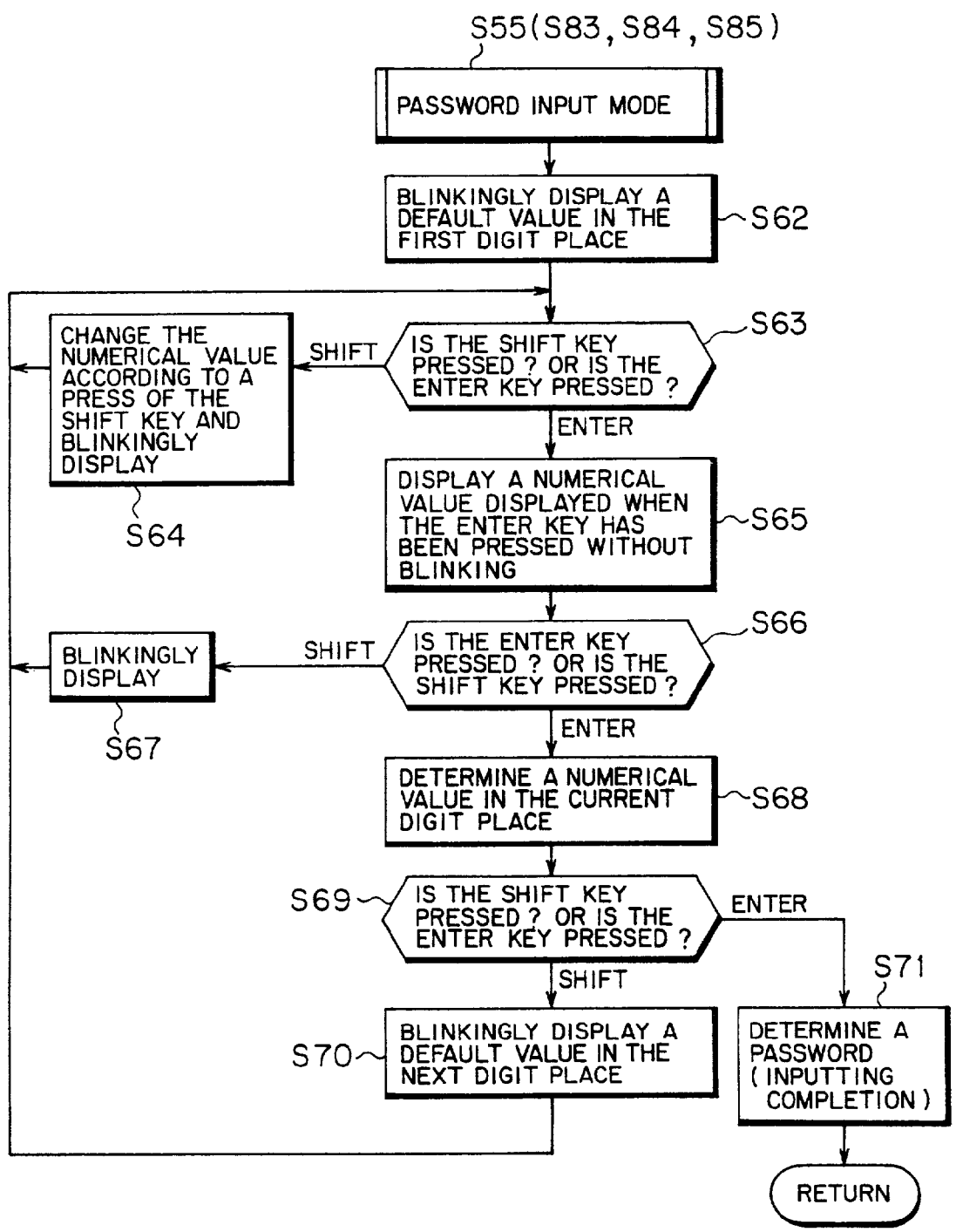
FIG. 18 is a flowchart for illustrating a password input mode according to the embodiment.

If inputting of the password is canceled while the password input mode (Step S55) is executed as shown in FIG. 17, the procedure can return any time to the initial display state (card status display; Step S51) of this function by pressing the select key 18a (YES route at Step S55').

When the password is determined in the password input mode as above, a lock cancel request is transmitted together with the password to the IC card 20 (Step S56), after that, a card status of the IC card 20 is again read or a response (a result of the collation) including the card state is received from the IC card 20 (Step S57), and the procedure returns to Step S51, at which the card status is displayed.

If the password is correct at this time, the card status is changed to the unlock status. The display of the card status on the display unit 11 thus becomes "UNLK". If the password is wrong, the card status is not changed to the unlock status. The display of the card status on the display unit 11 thus remains "LOCK" or becomes "LOUT".

A procedure for changing the card status from the lock status to the unlock status, and a display state at that time will be now described concretely with reference to FIG. 20. When the card status shifts to the password input mode by pressing the enter key 18c while "LOCK" is displayed as shown in FIG. 20, "PC=" is displayed, and simultaneously, a default value "1" in the first digit place is blinkingly displayed on the display unit 11. The numerical value in the first digit place is incremented one by one (1→2→ . . . →9→0→ . . . ) by pressing the shift key 18b. The blinking is stopped when the enter key 18c is pressed if the password is determined.

If the enter key 18c is pressed while "5" in the first digit place is displayed without blinking, for example, a numerical value in the first digit place is determined as "5", and the first digit place is masked by "–". When the shift key is pressed in a state where "5" in the first digit place is displayed without blinking, "5" is again blinkingly displayed, where the numerical value can be changed by the shift key 18b.

Similarly, numerical values in the second to the last digit place (five digit places in FIG. 20) are inputted. When the password inputting is completed, the enter key 18c is pressed. If the password is correct, the IC card is changed from the lock status to the unlock status, and the display of the card status is changed from "LOCK" to "UNLK" on the display unit 11.

When the current card state is unlock ("UNLK" route at Step S52) and the select key 18a is pressed while "UNLK" is displayed ["SELECT" route at Step S58 (S10)], the procedure proceeds to the password changing function (Step S11), which is the next function, as described before with reference to FIG. 7.

Figure 21:
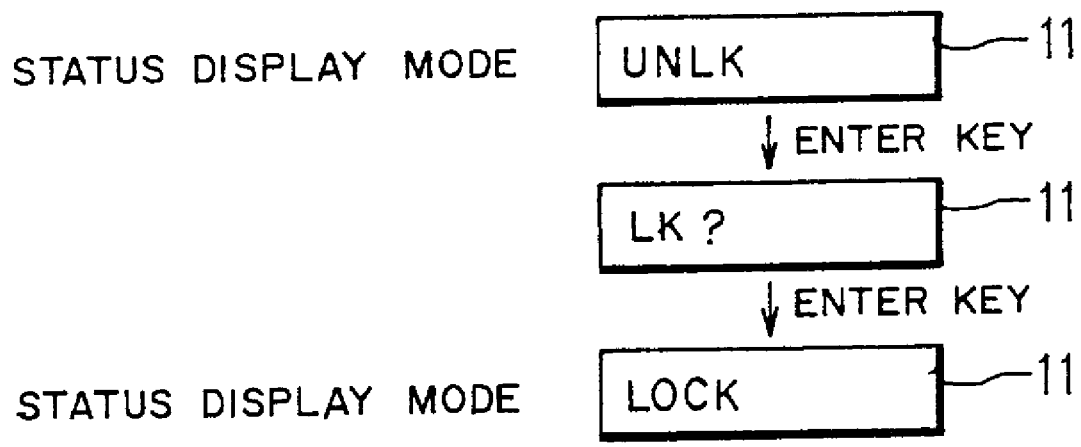
FIG. 21 is a diagram concretely showing the card status changing procedure (procedure for changing from the unlock status to the lock status) according to the embodiment.

When the enter key 18c is pressed while "UNLK" is displayed ("ENTER" route at Step S58) as shown in FIG. 21, for example, the procedure shifts to processes (Steps S59 through S61) of changing the status of the IC card 20 from the unlock status to the lock status.

When the IC card 20 is changed from the unlock status to the lock status, it is unnecessary to input/collate the password. First, "LK?" is displayed to confirm whether the card status is to be transited to the lock status or not. If the enter key 18c is pressed in response to this display ("ENTER" route at Step S60), the IC card 20 is transited to the lock status (Step S61), then the procedure returns to Step S51. At this time, the display of the card status on the display unit 11 is changed from "UNLK" to "LOCK".

When the shift key 18b or the select key 18a is pressed responsive to the confirmation display "LK?" ("SHIFT" route at Step S60), the processes of changing the IC card 20 from the unlock status to the lock status are canceled, and the procedure returns to the initial display state (card status display; Step S51) of this function.

According to the IC card processing apparatus 10 of this embodiment, it is possible to change the status of the IC card 20 while a password is inputted using the three types of keys 18a through 18cas above.

[G] Description of the password changing function

Figure 22:
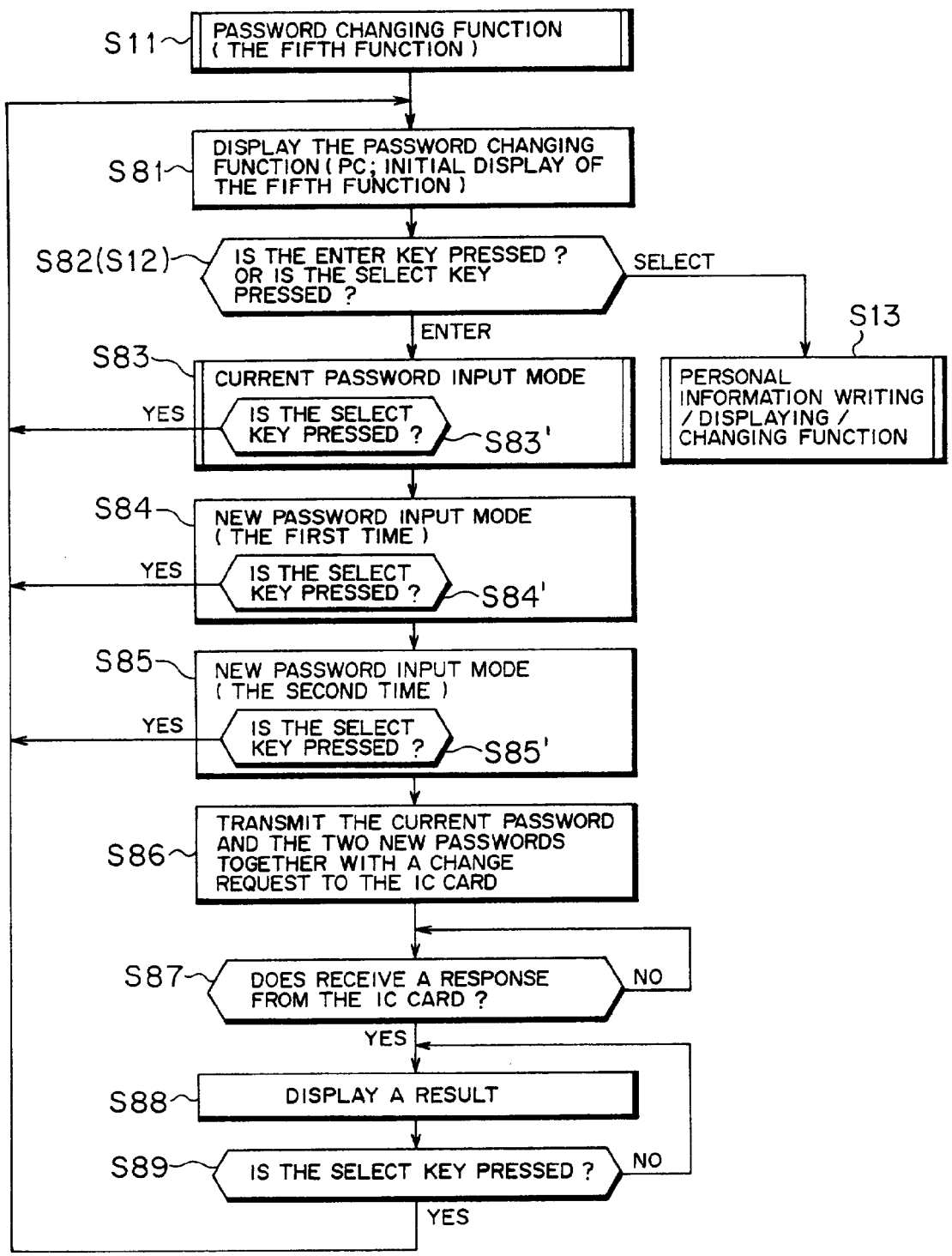
FIG. 22 is a flowchart for illustrating a password changing function according to the embodiment.

Next, the password changing function (the fifth function) of the IC card processing apparatus 10 of this embodiment will be described with reference to a flowchart (Steps S81 through S89) shown in FIG. 22, and FIG. 23. According to this embodiment, it is possible to change a password registered in the IC card 20 using the password input mode described before with reference to FIG. 18, as below.

Figure 23:
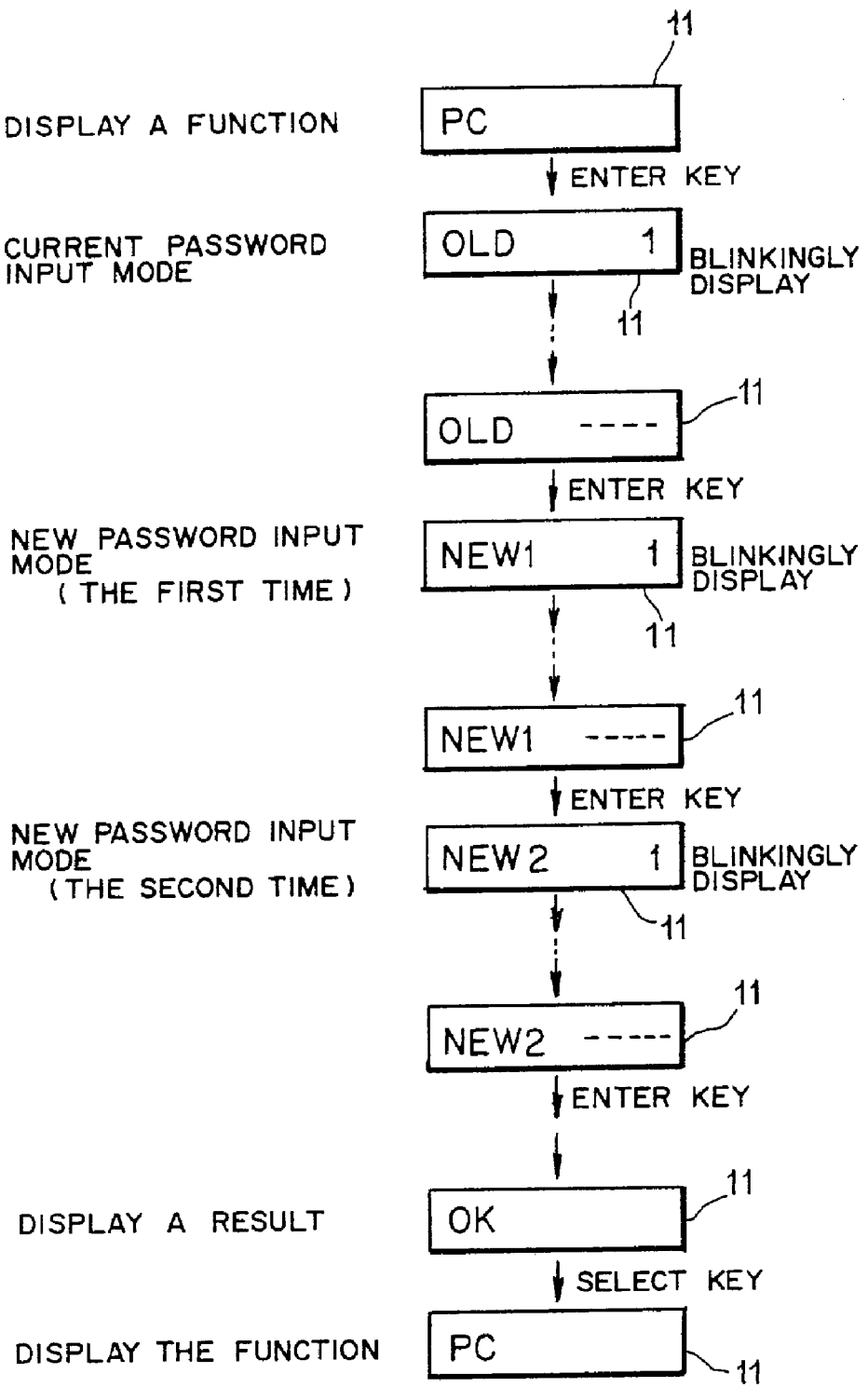
FIG. 23 is a diagram concretely showing a password changing procedure and a display state at that time according to the embodiment.

According to the password changing function (Step S11), which is the fifth function of this embodiment, "PC" is displayed as the initial display on the display unit 11 (Step S81), as shown in FIG. 23, for example.

When the select key 18a is pressed during the initial display ["SELECT" route at step S82 (S12)], the procedure proceeds to the personal information writing/displaying/changing function (Step S13), which is the next function, as described before with reference to FIG. 7.

When the enter key 18c is pressed during the initial display ("ENTER" route at Step S82), a current password is inputted (Step S83; a current password input mode). In the current password input mode, "OLD" is displayed on the display unit 11 as shown in FIG. 23. Inputting of the current password at Step S83 is performed in a manner similar to the password input mode described before with reference to FIG. 18. If the operator or the like of the IC card 20 intends to cancel the inputting of the password while inputting the current password, the operator or the like of the IC card 20 presses the select key 18a (YES route at Step S83'), whereby the procedure returns to the initial display state ("PC" display; Step S81) of this embodiment any time.

After the current password is inputted, the procedure proceeds to a new password input mode to input a new password [Step S84; the new password input mode (the first time)]. In the new password input mode (the first time), "NEW1" is displayed on the display unit 11 as shown in FIG. 23. Inputting of the new password at Step S84 is performed in a manner similar to the password input mode described before with reference to FIG. 18. If the operator or the like of the IC card 20 intends to cancel the inputting of the password while inputting the new password, the operator or the like of the IC card 20 presses the select key 18a (YES route at Step S84'), whereby the procedure returns to the initial display state ("PC" display; Step S81) of this function any time.

According to this embodiment, the new password which has been inputted at Step S84 is again inputted for confirmation after the new password is inputted once [Step S85; the new password input mode (the second time)]. In the new password input mode (the second time), "NEW2" is displayed on the display unit 11 as shown in FIG. 23. The inputting of the new password is performed in a manner similar to the password input mode described before with reference to FIG. 18. If the holder of the IC card 20 intends to cancel the inputting of the password while inputting once more the new password, the holder of the IC card 20 presses the select key 18a (YES route at Step S85'), whereby the procedure returns to the initial display state ("PC" display; Step S81) of this function any time.

After the current password is inputted and the new password is inputted twice as above, the current password and the new password inputted twice are transmitted together with a password change request to the IC card 20 (Step S86), and the current password is collated/confirmed and the new password is confirmed/registered in the IC card 20.

The MPU 12 waits for a response from the IC card 20. When receiving the response (YES route at Step S87), the MPU 12 displays a result of the change of the password on the display unit 11 (Step S88). When the password is changed in the IC card 20, "OK" is displayed as shown in FIG. 23. When the operator who changed the password (a holder or the like of the IC card 20) confirms it and presses the select key 18a (YES route at Step S89), the procedure returns to the initial display state ("PC" display; Step S81) of this function.

According to the IC card processing apparatus 10 of this embodiment, it is possible to change a password of the IC card 20 using the three types of keys 18a through 18c while the password is inputted.

[H] Description of the personal information writing/displaying/changing function (memorandum function)

Figure 24:
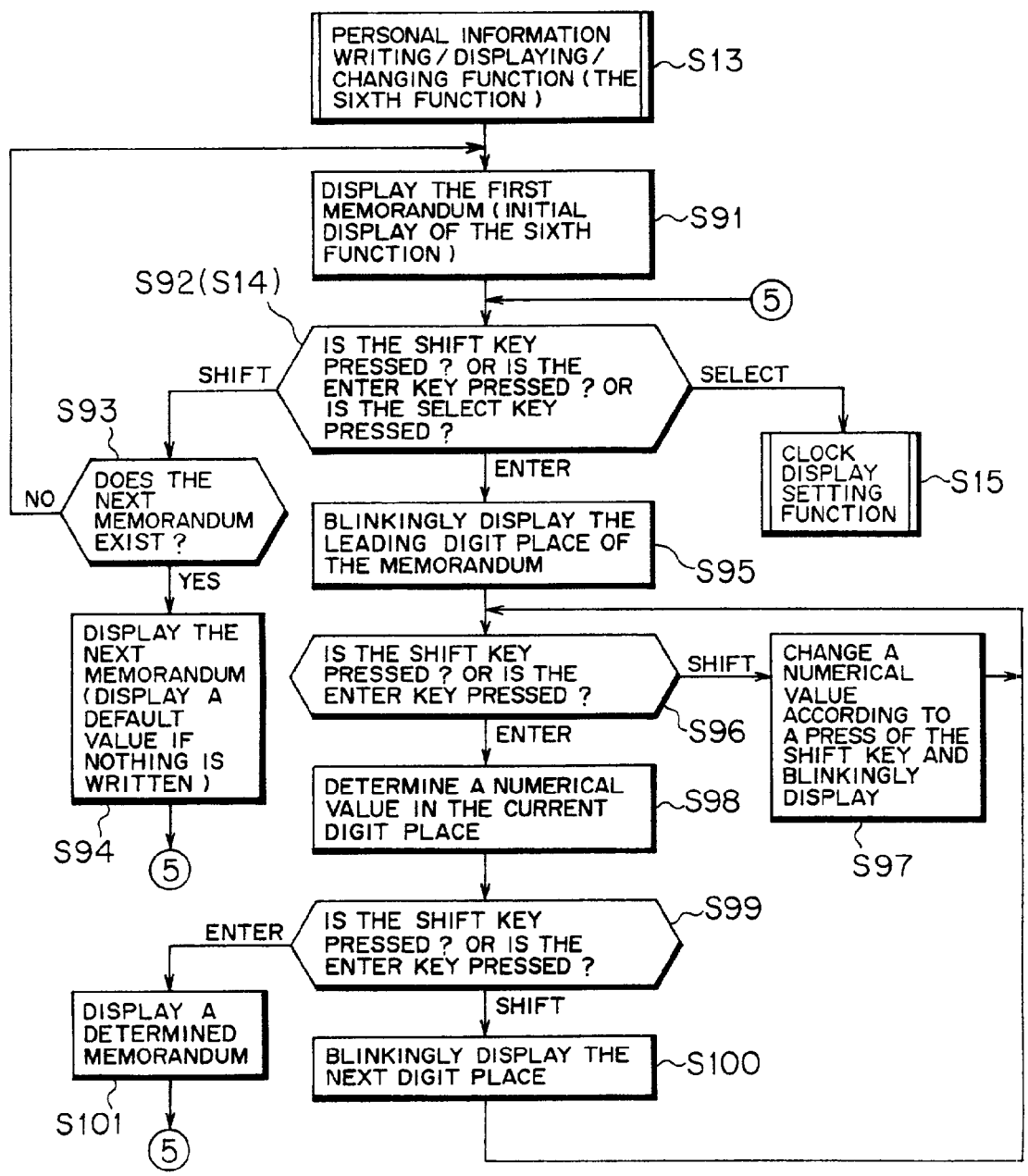
FIG. 24 is a flowchart for illustrating a personal information writing/displaying/changing function (memorandum function) according to the embodiment.

Next, the personal information writing/displaying/changing function (the sixth function; the memorandum function) of the IC card processing apparatus 10 of this embodiment will be described with reference to a flowchart (Steps S91 through S101) shown in FIG. 24, and FIGS. 25 and 26.

Figure 25:
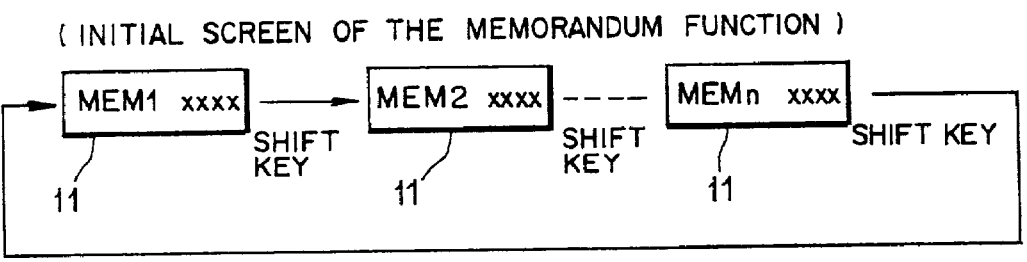
FIG. 25 is a diagram for illustrating a personal information display state according to the embodiment.
Figure 26:
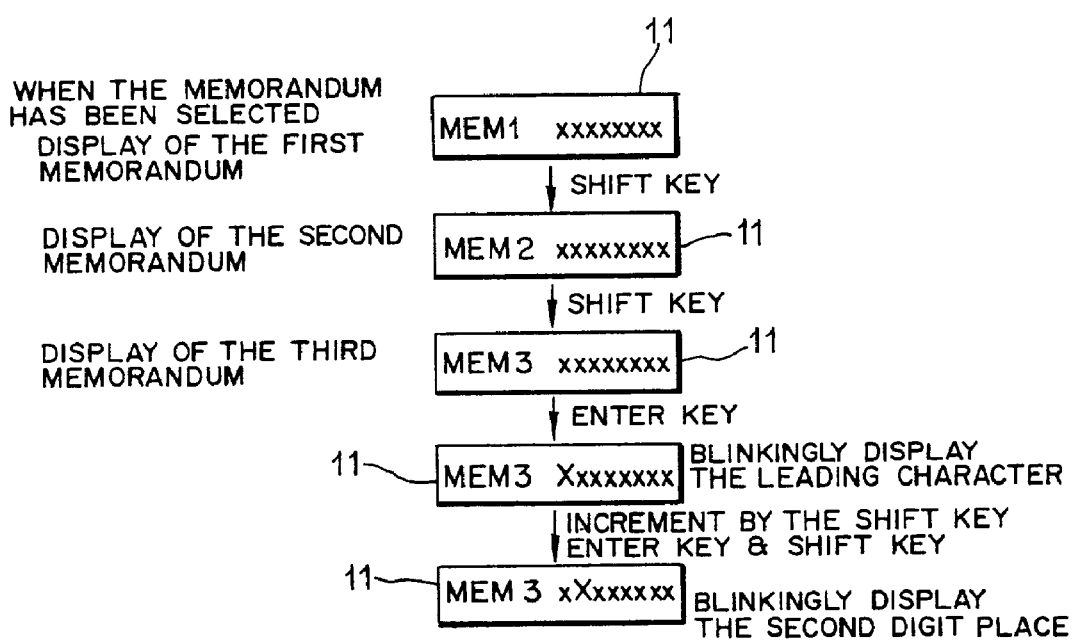
FIG. 26 is a diagram concretely showing a personal information changing procedure (personal information writing procedure) and a display state at that time according to the embodiment.

According to the personal information writing/displaying/changing function (Step S13), which is the sixth function of this embodiment, the first memorandum ("MEM1"; personal information) is displayed as the initial display on the display unit 11, as shown in FIGS. 25 and 26, for example (Step S91). If nothing is written in the first memorandum at this time, a default value is displayed.

When the select key 18a is pressed during the initial display ["SELECT" route at Step S92 (S14)], the procedure proceeds to the clock display setting function (Step S15), which is the next function, as described before with reference to FIG. 7.

If the shift key is pressed during the initial display ("SHIFT" route at Step S82) and the next memorandum exists (YES route at Step S93), the next memorandum is displayed (Step S94). The procedure then returns to Step S92, at which the same process is repeated. If nothing is written in the second and the succeeding memorandums, the default value is displayed.

When the last memorandum is displayed (NO route at Step S93), the procedure again returns to Step S91, at which the first memorandum is displayed. When the select key 18a is pressed while each memorandum is displayed ["SELECT" route at Step S92 (S14)], the procedure immediately proceeds to the clock display setting function (Step S15).

If n memorandums ("MEM1" through "MEMn"; personal information) exist as shown in FIG. 25, for example, a display of the memorandum is successively changed each time the shift key 18b is pressed. After the n-th (the last) memorandum is displayed on the display unit 11, the procedure returns to a display state of the first memorandum.

According to the personal information writing/displaying/changing function, it is possible to change contents of the display on the display unit 11, and display plural pieces of personal information (memorandums) successively and cyclically by pressing the shift key 18b.

When the enter key 18c is pressed while the memorandum (personal information) is displayed ("ENTER" route at Step S92), the IC card status is changed to a mode to write/change the personal information in the memorandum, and a value in the leading digit place of the memorandum is blinkingly displayed on the display unit 11 (Step S95). When the shift key 18b is pressed in this state ("SHIFT" route at Step S90'), the numerical value in the leading digit place is changed and blinkingly displayed according to a press of the shift key 18b (Step S97).

When the enter key 18c is pressed ("ENTER" route at Step S96), a numerical value displayed when the enter key 18c is pressed is determined as a value in the leading digit place (Step S98).

When the shift key 18b is pressed after that ("SHIFT" route at Step S99), a value in the next digit place is blinkingly displayed (Step S100). The procedure then returns to Step S96. Processes at Steps S96 through S100 are repeatedly executed until the writing or changing of the personal information is completed.

When the writing or changing of the personal information is completed and enter key 18c is pressed at Step S99, the personal information to be written as a memorandum is determined, the memorandum is displayed (Step S101), and the procedure returns to Step S92.

The memorandums (personal information such as name, personal number, telephone number, account number, etc.) determined as above are written in a user area in the memory 21 of the IC card 20.

Now, a procedure for changing personal information (personal information writing procedure) in third memorandum ("MEM3") and a state of the display at that time will be described concretely with reference to FIG. 26. As shown in FIG. 26, the shift key 18b is pressed two times in the initial display state where the first memorandum is displayed to display the third memorandum, then the enter key 18c is pressed. Whereby, the IC card 20 becomes a mode to write/change personal information in the third memorandum, and a value (X) in the leading digit place of the memorandum is blinkingly displayed on the display unit 11.

In this state, a numerical value in a digit place now blinkingly displayed is incremented one by one by pressing the shift key 18b (next to 9 is 0). When a numerical value is intended to be set, the enter key 18c is pressed. Next, a value in the second digit place is blinkingly displayed by pressing the shift key 18b. After that, the writing/changing is performed in the similar manner. Finally, the memorandum written/changed is determined by pressing the enter key 18c two times, and registered in the memory 21 of the IC card 20.

When the shift key 18b is pressed after inputting of a numerical value in the last digit place is completed ("SHIFT" route at Step S99), the value in the first digit place is again blinkingly displayed (Step S100). When the select key 18a is pressed during the blinking display, the writing/altering of a value in a digit place now blinkingly displayed is stopped, and the display returns to a state of the original memorandum. If the operator intends to change only a value in a certain digit place, it is possible to move the digit place to be blinkingly displayed (a digit place to be changed) to a desired digit place.

According to the IC card processsing apparatus 10 of this embodiment, it is possible to register personal information as memorandums in the memory 21 of the IC card 20, and display or change the memorandum by using the three types of keys 18a through 18c, as above.

[I] Description of the clock display setting function

Figure 27:
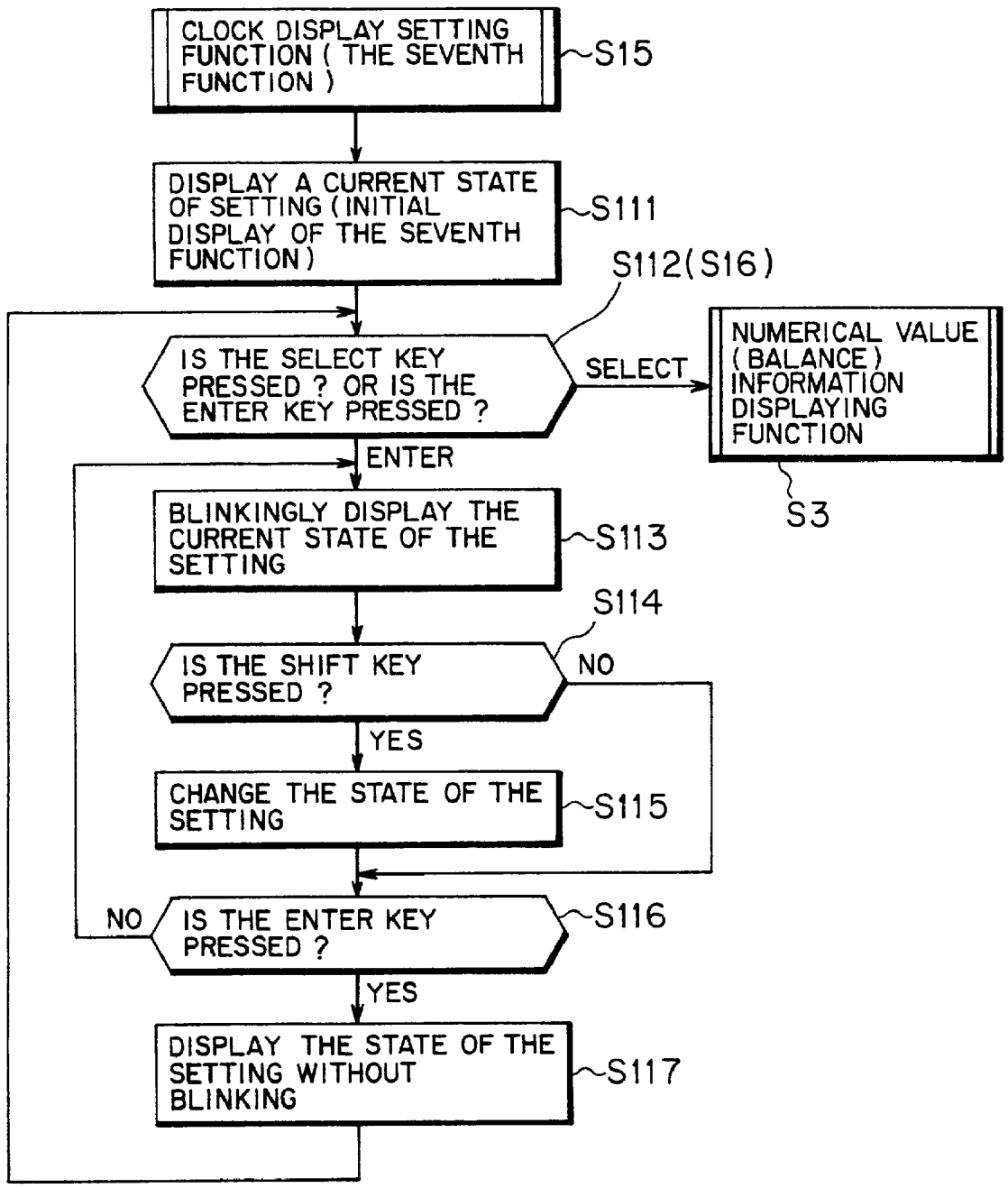
FIG. 27 is a flowchart for illustrating a clock display setting function according to the embodiment.
Figure 28:
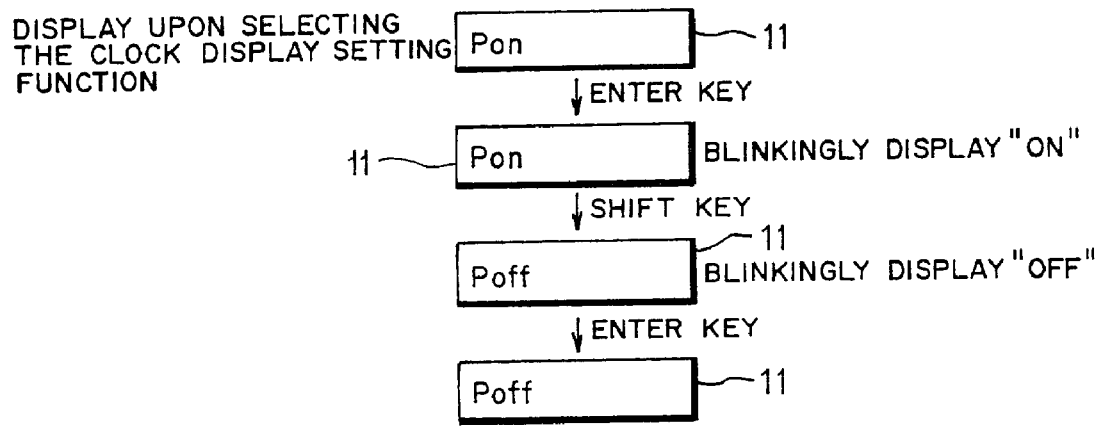
FIG. 28 is a diagram concretely showing a clock display setting procedure and a display state at that time according to the embodiment.

Next, the clock display setting function (the seventh function) of the IC card processing apparatus 10 of this embodiment will be described with reference to a flowchart (Steps Sill through S117) shown in FIG. 27, and FIG. 28.

The clock display setting function (Step S15) which is the seventh function of this embodiment, is to set, in a state where the IC card 20 is inserted in the IC card processing apparatus 10, whether a clock is displayed on the display unit 11 of the IC card processing apparatus 10 or not when the IC card 20 is not inserted, as described hereinbefore. When the clock display setting function is selected, a current state of clock display setting ("Pon": clock display effective, "Poff": clock display ineffective) is displayed on the display unit 11 as the initial display (Step S111).

When the select key 18a is pressed during the initial display ["SELECT" route at Step S112 (S16)], the procedure returns to the numerical value (balance) information displaying function (Step S3) which is the first function, as described before with reference to FIG. 7.

When the enter key 18c is pressed during the initial display ("ENTER" route at Step S112), the IC card 20 gets into a setting change mode, in which a current state of setting is blinkingly displayed (Step S113). When the shift key 18b is pressed in this state (YES route at Step 114), the setting is changed to OFF if the current setting is ON, or the setting is changed to ON if the current setting if OFF (Step S115).

By pressing the enter key 18c (YES route at Step S116), the a state of setting is determined, the state of clock display setting ("Pon" or "Poff") is displayed without blinking (Step S117), and the procedure returns to Step S112. The state of clock display setting having been changed and set is registered in the clock display setting register 26 provided to the MPU 12. A flag is set in the register 26 if the clock display setting is effective.

Now, a procedure for changing the state of clock display setting from effective to ineffective and a state of the display at that time will be described with reference to FIG. 28. As shown in FIG. 28, by pressing the enter key 18c during the initial display where a current state of setting "Pon" is displayed, "on" is blinkingly displayed. When the shift key 18b is pressed after that, "on" is changed to "off". When the enter key 18c is pressed, "Poff" is displayed in a state where the blinking is stopped, and a stop of a clock function (low power consumption mode) applied when the IC card 20 is not inserted is determined.

According to the IC card processing apparatus 10 of this embodiment, it is possible to change the state of the clock display setting using three types of keys 18a through 18c as above.

[J] Description of a technique of shortening a display time.

In the IC card processing apparatus 10 of this embodiment, in order to display the first piece of information (the first piece of balance information in a default pocket in this embodiment) on the display unit 11 as soon as possible when the IC card 20 is inserted, the MPU 12 starts reading data from the memory 21 of the IC card 20 when the IC card 20 is inserted into the IC card processing apparatus 10. The MPU 12 controls the display unit 11 to display the first piece of balance information simultaneously with completion of the reading of the first piece of balance information in the default pockets, continuously reads the following data after the first piece of balance information is displayed, and successively makes other functions effective after completion of the reading.

Figures 29A, 29B, 29C:
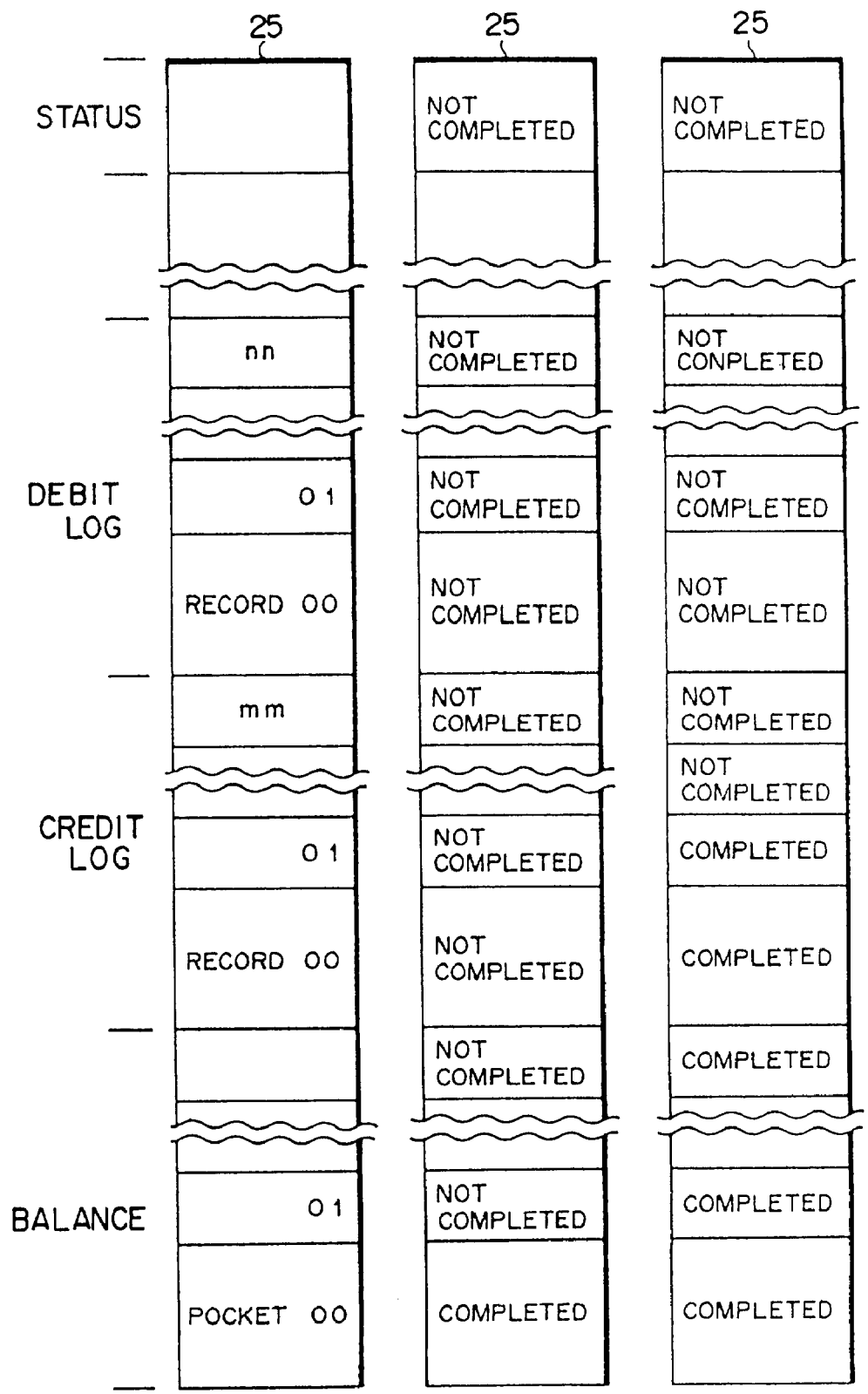
FIGS. 29(a) through 29(c) are diagrams showing a structure of a judging register and examples of flag setting according to the embodiment.

According to this embodiment, the judging register as shown in FIGS. 29(a) through 29(c) is provided to the MPU 12, whereby the MPU 12 readily judges a timing at which a press of each of the keys 18a through 18c becomes effective when a function is selected.

Namely, in the judging register 25, a reading-completion flag is set at each unit of read information of data having been read out from the memory 21 of the IC card 20 by the MPU 12, as described hereinbefore.

In concrete, the judging register 25 of this embodiment is so configured that the reading-completion flag can be set at each of pockets No. 00 through No. 11 for storing the balance information, the reading-completion flag can be set at each of records No. 00 through No. mm for storing the credit log information, the reading-completion flag can be set at each of records No. 00 through No. nn for storing debit log information, and the reading-completion flag can be set with respect to a card status of the IC card 20, as shown in FIG. 29(a).

The MPU 12 starts reading data from the IC card 20. At a point of time that the reading-completion flag is set at only the pocket No. 00 of the balance information as shown in FIG. 29(b), the balance information in the pocket No. 00 is displayed on the display unit 11. However, any of the select key 18a the shift key 18b and the enter key 18c cannot function even if oressed at this time.

The MPU 12 continues to read the data. At a point of time that the MPU 12 has read the credit log information in the record No. 01 as shown in FIG. 29(c), for example, the numerical value (balance) information displaying function, which is the first function, becomes effective so that all the balance information can be displayed. As to the credit log information, up to the second record can be displayed by operating the shift key 18b. However, the debit log information or the card status cannot be displayed yet.

Next, description will be made of a data reading control and a display control conducted using the above judging register 25 by the IC card processing apparatus 10 (the MPU 12) in brief with reference to a flowchart (Steps S121 through S127) shown in FIG. 30.

Figure 30:
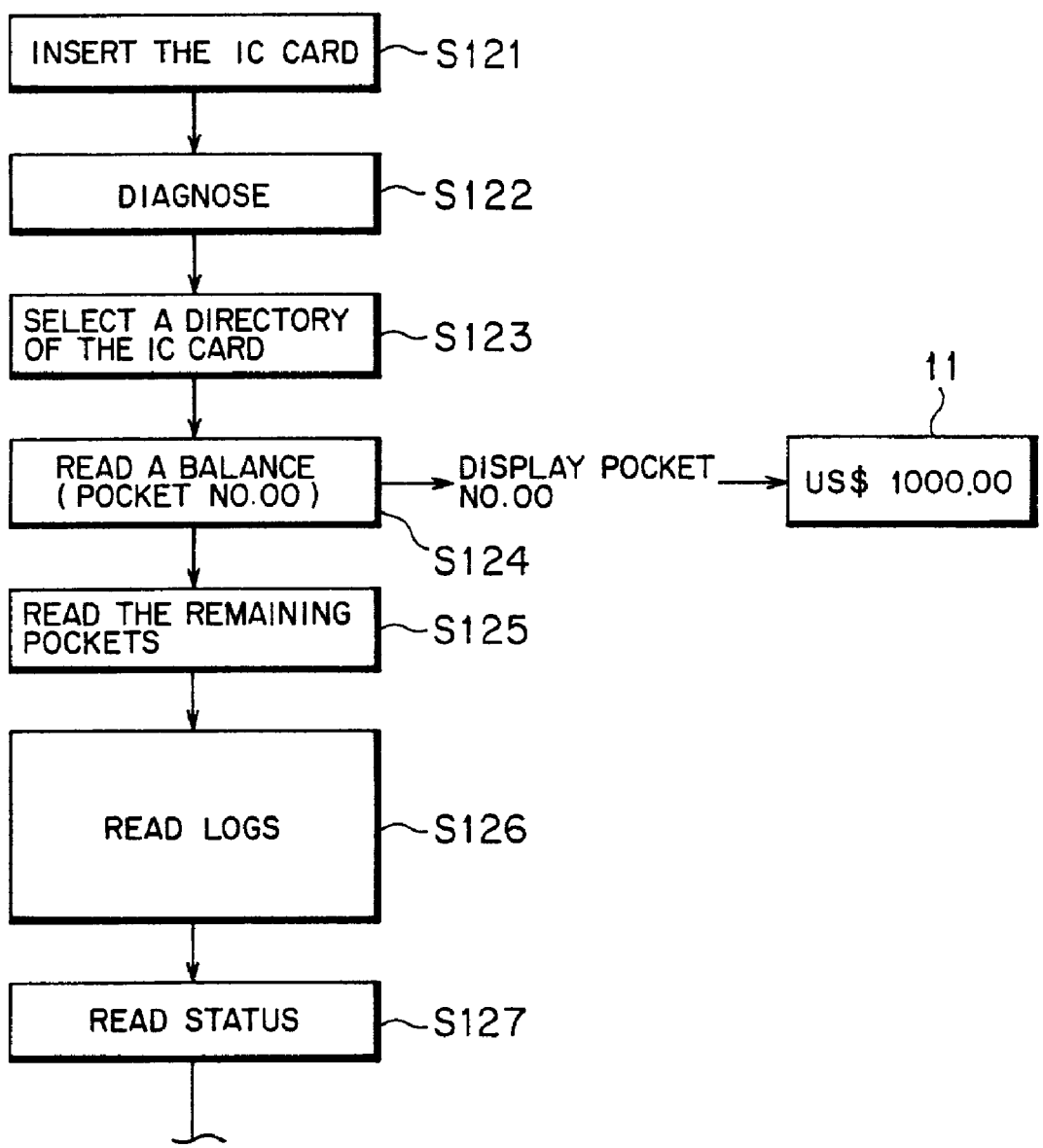
FIG. 30 is a flowchart for illustrating a data reading control and a display control conducted using the judging register according to the embodiment.
Figure 31:
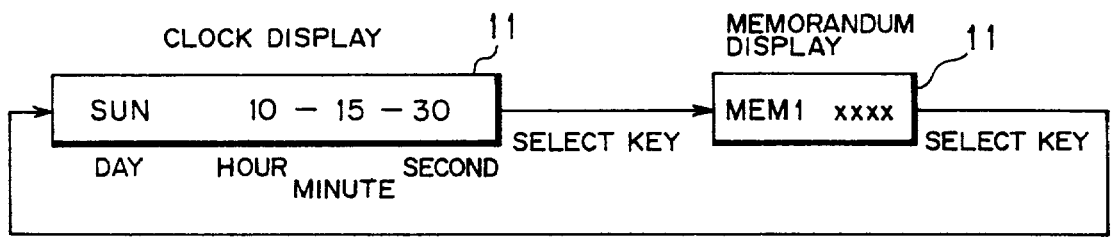
FIG. 31 is a diagram for concretely illustrating a display state in the card unit processing apparatus according to the embodiment when the card unit is not inserted thereto.

As shown in FIG. 30, when the IC card 20 is inserted into the IC card processing apparatus 10 (Step S121), the MPU 12 diagnoses the registers 25 through 27, the ROM 14, the RAM 15, etc. in the IC card processing apparatus 10 (Step S122). After that, the MPU 12 selects a directory in the memory 21 of the IC card 20 (Step S123).

The MPU 12 then reads the balance information in the default pocket No. 00 from the memory 21 of the IC card 20 (Step S124), and sets the reading-completion flag at the Pocket No. 00 in the judging register 25, besides displaying the balance information ("US$ 1000.00", for example) in the pocket No. 00. Next, the MPU 12 reads the balance information in the remaining pockets, and sets the reading-completion flag in the judging register 25 each time the MPU 12 reads the balance information in each of the pockets (Step S125). Each time the MPU 12 reads the balance information in each of the pockets, the display can be changed by the shift key 18b.

In a similar manner, the MPU 12 reads the log information (transaction history information), and sets the reading-completion flag in the judging register 25 each time the MPU 12 reads the log information in each of the records (Step S126).

Namely, at a point of time that the MPU 12 has read the credit log information in the first record (record No. 00), the first press of the select key 18a becomes effective. By the first press of the select key 18a the credit log information in the first record is displayed as the initial display of the credit transaction history displaying function. After that, each time the credit log information in one of the records is read, a press of the shift key 18b becomes effective. At a point of time that the MPU 12 has read the debit log information in the first record (record No. 00), the second press of the select key 18a becomes effective. By the second press of the select key 18a the debit log information in the first record is displayed as the initial display of the debit transaction history displaying function. After that, each time the debit log information in one of the records is read, a press of the shift key 18b becomes effective.

When reading a card status (lock, unlock or lock-out) of the IC card 20 (Step S127), the MPU 12 sets the reading-completion flag in the judging register 25. At this point of time, the status displaying function by pressing the select key 18a becomes effective.

According to the IC card processing apparatus 10 of this embodiment, the MPU 12 can readily judge a timing at which a press of each of the keys 18a through 18c becomes effective when the function is selected, using the judging register 25. It is also possible to largely shorten a time required from when the IC card 20 is inserted into the IC card processing apparatus 10 to when the display unit 11 displays.

[K] Description of a function performed when the IC card 20 is not inserted

The IC card processing apparatus 10 of this embodiment fulfils the above seven functions according to presses of the keys 18a through 18c. When the IC card 20 is not inserted, the MPU 12 fulfils an original function using the displaying unit 11.

According to this embodiment, the card detecting switch 19a (also used as the power supplying switch 31) for detecting whether the IC card 20 is inserted or not is provided, as shown in FIGS. 5(a) and 5(b). When the IC card 20 is not inserted as shown in FIG. 5(a), the original function is realized by the MPU 12. As a function performed when the IC card 20 is not inserted, the IC card processing apparatus 10 has the clock displaying function and the memorandum function described before.

These functions become available by always supplying the power to the MPU 12. According to this embodiment, a flag is set in the relay controlling register 27, whereby the relay switch 32 is turned ON (closed) when the IC card 20 is not inserted. The MPU 12 can thereby always detect presses of the keys 18a through 18c in an operable state so as to realize various functions by pressing the key 18a, 18b or 18c. If paying no regard to low power consumption, it is possible to omit the relay switch 32 and the power supplying switch 31 (the card detecting switch 19a) to always supply the power from the battery 30 to the MPU 12.

In this embodiment, a clock display effectiveness setting is carried out in the manner described before with reference to FIG. 27 so that the clock displaying function is executed if the flag is set in the clock display setting register 26.

According to the memorandum function, the MPU 12 stores memorandum information in the RAM 15 (memorandum information storing unit) according to presses of the keys 18a through 18c, and displays the memorandum information stored in the RAM 15 on the display unit 11. Owing to the memorandum function, it is possible to readily display/set a memorandum in the operation described before with reference to FIG. 24, similarly to the example shown in FIGS. 25 and 26.

When the clock displaying function is effective, it is possible to select the clock displaying function or the memorandum function by pressing the select key 18a, similarly to the example shown in FIG. 7. Namely, when the select key 18a is pressed in a clock display state, the clock display is changed to a memorandum display. When the select key 18a is pressed in the memorandum display state, the state is changed to the clock display state.

When the enter key 18c is pressed while the clock is displayed, the state shifts to a time adjust mode, in which each parameter (day, time, minute, second) is blinkingly displayed according to a press of the enter key 18c to indicate a selectable state (changeable state). The parameter being now blinkingly displayed is cyclically changed by pressing the shift key 18b, and set by pressing the enter key 18c then the next parameter is blinkingly displayed.

Figure 32:
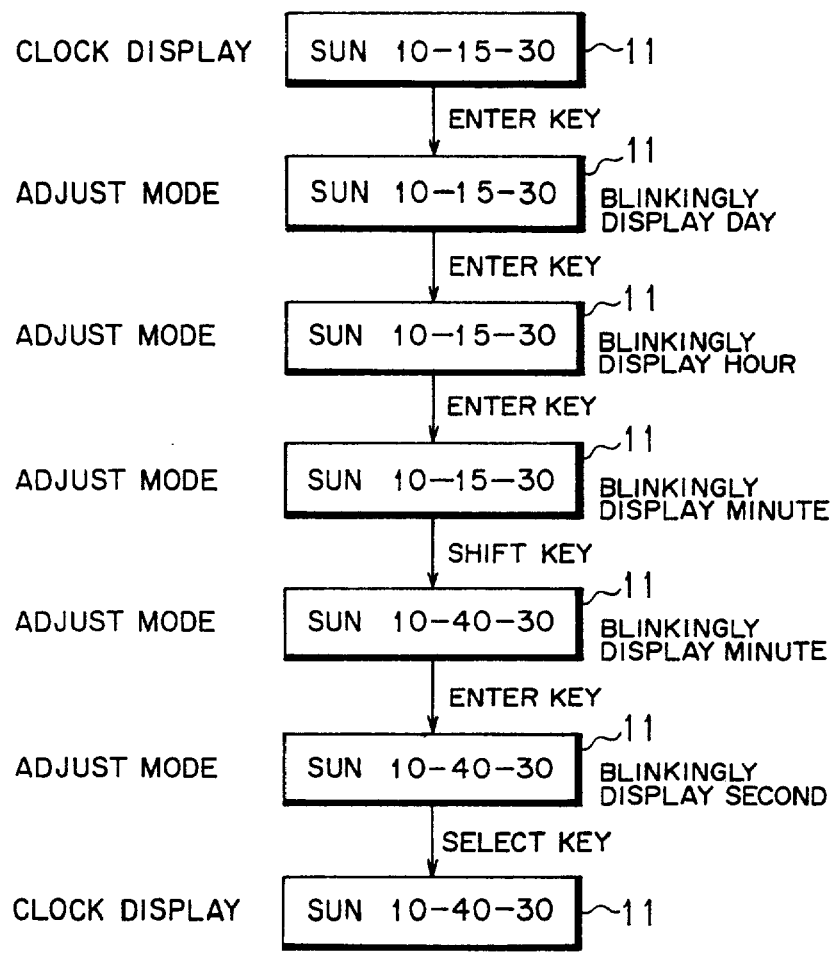
FIG. 32 is a diagram concretely showing a time adjusting procedure by a clock displaying function and a display state at that time according to the embodiment.

Now, a procedure for changing a display of minute of time from "15" to "40" and a state of the display at that time will be concretely described with reference to FIG. 32. As shown in FIG. 32, the state shifts to the adjust mode by pressing the enter key 18c while the clock is displayed, in which the first parameter (day, "SUN") is blinkingly displayed. This time, there is no need of changing the day so that the enter key 18c is pressed.

Whereby, the second parameter (hour "10") is blinkingly displayed. This time, there is also no need of changing the display of hour so that the enter key 18c is pressed. The third parameter (minute "15") is then blinkingly displayed. In this state, the display of minute "15" is changed to "40" by pressing the shift key 18c. Thereafter, the enter key 18c is pressed, whereby the fourth parameter (second "30") is blinkingly displayed. This time, there is no need of changing the display of second so that the select key 18a is pressed to terminate the setting. Whereby, the state is changed to the clock display state.

According to the clock displaying function, the MPU 12 can such control that time is automatically displayed on the display unit 1 only during a display period arbitrarily set in advance, whereas time is temporarily displayed on the display unit 11 outside the above display period only when any one of the keys 18a through 18c is pressed. In concrete, time is always displayed only during the day time, while time is displayed only by pressing the key during the night time in which use of the IC card 20 is rare.

According to the IC card processing apparatus 10 of this embodiment, it is possible to realize various functions using the display unit 11, the MPU 12, the RAM 15, the keys 18a through 18c even when the IC card 20 is not inserted so as to realize multi-functioning.

[L] Description of the low power consumption mode

When not inserted the IC card 20, the IC card processing apparatus 10 of this embodiment shifts to a low power consumption mode to save a power to be supplied from the battery 30 to the communicating unit 16, the displaying unit 11 and the MPU 12.

As an example of the low power consumption mode, here is provided a technique of designating YES or NO of power supply depending on whether the above-mentioned functions are performed when the IC card 20 is not inserted (in the case where the power is supplied even when the IC card 20 is not inserted), or the above-mentioned functions are not performed when the IC card 20 is not inserted (in the case where the power is not supplied when the IC card 20 is not inserted).

According to this embodiment, the relay switch 32 controlled by the program (software) through the relay controlling register 27 to be turned ON/OFF is provided in parallel to the power supplying switch 31 (the card detecting switch 19a) so that it is possible to arbitrarily set whether the power is supplied from the battery 30 to the MPU 12 when the IC card 20 is not inserted.

Figure 33A:
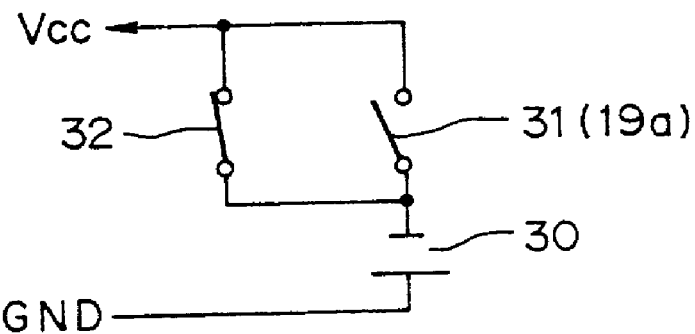
FIGS. 33(a) through 33(c) are circuit diagrams for illustrating operations of switches (low power consumption mode) in a power supplying system according to the embodiment.

In order to make the functions effective when the IC card 20 is not inserted, a flag for the relay switch 32 is set in the relay controlling register 27, whereby the relay switch 32 is turned ON as shown in FIG. 33(a) even when the IC card 20 is not inserted to always supply the power from the battery 30 to the MPU 12. Such state can be changed to a state shown in FIG. 33(b) or 33(c) by giving an instruction or the like of the program.

If intended to make the functions ineffective when the IC card 20 is not inserted, the flag for the relay switch 32 is not set in the relay controlling register 27, whereby the relay switch 32 is always in the OFF state.

Figure 33B:
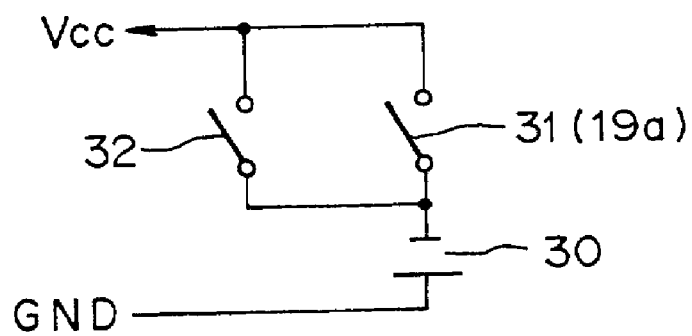
Figure 33C:
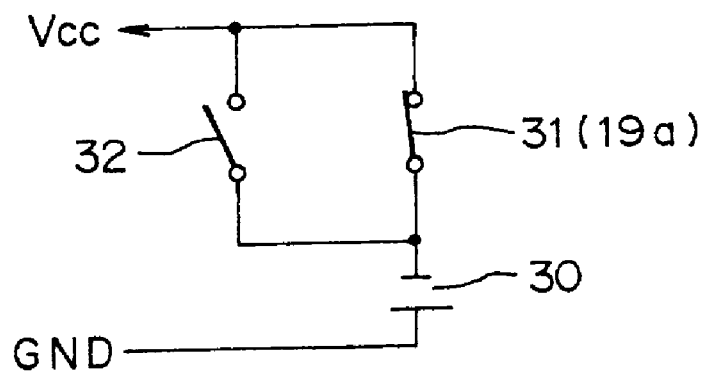
Figure 34A:
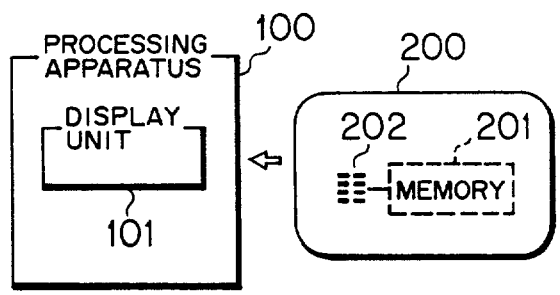
FIGS. 34(a) and 34(b) are plan views schematically showing appearances of a general balance display when a card is not inserted thereto and when the card is inserted thereto, respectively.
Figure 34B:
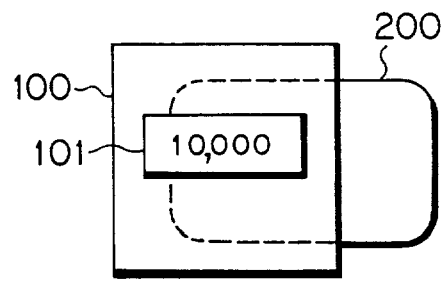
Figure 35:
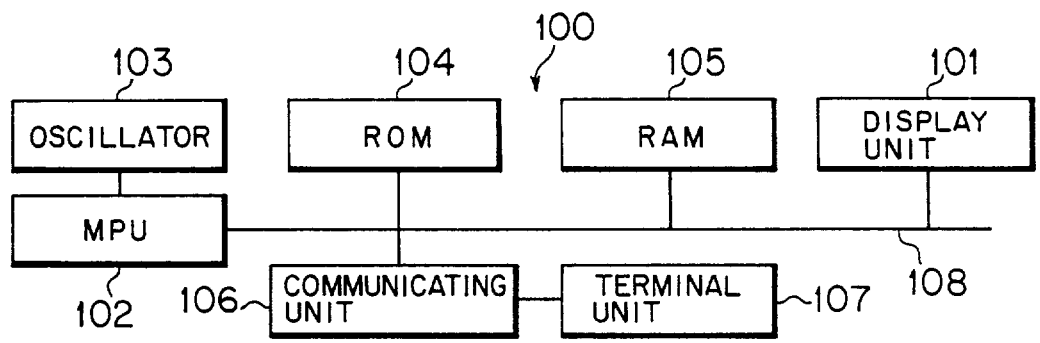
FIG. 35 is a block diagram showing a hardware structure of the general balance display.
Figure 36:
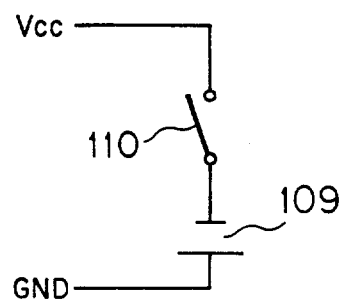
FIG. 36 is a circuit diagram for illustrating a power supplying system and a state of switch installation in the general balance display.

In this case, if the IC card 20 is not inserted, no power is supplied to the MPU 12 since the power supplying switch 31 (the card detecting switch 19a) and the relay switch 32 are both in the OFF state, as shown in FIG. 33(b). As a result, the IC card processing apparatus 10 is in an inoperable state. It is impossible to change such state to a state as shown in FIG. 33(a).

When the IC card 20 is inserted in a state shown in FIG. 33(b), the power supplying switch 31 (the card detecting switch 19a) is turned ON so that the power is supplied from the battery 30 to the MPU 12, where the above-mentioned processes (the first to seventh functions) on the IC card become possible. Such state can be changed to a state shown in FIG. 33(a) by giving an instruction or the like from of program.

By combining the card detecting switch 19a (the power supplying switch 31) to the relay switch 32 as above, it is possible to readily set whether the functions are effective or not when the IC card 20 is not inserted. If the functions are made ineffective when the IC card 20 is not inserted, a life of the battery 30 can be lengthen since the power is not always supplied to the MPU 12.

As the low power consumption mode, there is also a technique of automatically deleting a display by the MPU 12 when the same information is displayed on the display unit 11 continuously for a predetermined period irrespective of whether the IC card 20 is inserted or not inserted.

As another low power consumption, there is still also a technique of ① stopping the power supply to the communicating unit 16, ② stopping the power supply to the displaying unit 11, and ③ clock-down for the MPU 12.

Since the communicating unit 16 is not required to communicate at all while the IC card 20 is not inserted, stopping the power supply to the communicating unit 16 while the IC card 20 is not inserted is effective to realize a low power consumption. According to this embodiment, the power is supplied to the communicating unit 16 via the power supplying switch 31 as shown in FIG. 4(b), thereby being able to be supplied to the communicating unit 16 when the IC card 20 is inserted. On the other hand, the communicating unit 12 is disconnected from the battery 30 while the IC card 20 is not inserted, whereby the power supply is stopped.

If there is no need of displaying on the display unit 11, stopping the power supply to the display unit 11 is effective in order to realize a low power consumption. According to this embodiment, the power is supplied to the display unit 11 via the power supply instructing switch 33 for the display unit 11, whereby it is possible to arbitrarily set whether the power supply to the display unit 11 is stopped or not by the program (software).

Since the IC card processing unit 10 is not required to communicate with the IC card 20 while the IC card 20 is not inserted, it is possible to further decrease a power consumption by operating the MPU 12 with a clock in a low frequency. At this time, a decrease to some degree in processing speed causes no problem since the processing speed does not have preference in the memorandum function (a main process thereof is to read-from/write-in the RAM 15) performed when the IC card 20 is not inserted.

According to this embodiment, the clock supplying system 13 has the high-frequency clock oscillator 13a, the low-frequency clock oscillator 13b and the switching circuit 13c whose hardware is switched by the program or insertion/non-insertion of the IC card 20. Namely, when the IC card 20 is inserted or the program designates it, a clock supplied from the oscillator 13a oscillating a clock in a high-frequency is selected to be outputted to the MPU 12. On the other hand, when the IC card 20 is not inserted or the program designates it, a clock supplied from the oscillator 13b oscillating a clock in a low-frequency is selected to be outputted to the MPU 12.

Whereby, the IC card processing apparatus 10 can carry out clock-down when the IC card 20 is not inserted, or the program designates so (when the communicating unit 16 is not used, for example) irrespective of whether the IC card 20 is inserted or not. As a result, it is possible to realize a low power consumption, that is, lengthen a life of the battery 30.

[M] Others

The above embodiment has been described by way of an example where the card unit is an IC card. However, this invention is not limited to the above example, but applicable to another card unit such as an optical card, a radio card, etc., so long as it incorporates a storage unit, bringing the same effects as the above embodiment.

The above embodiment has been also described by way of an example where the terminal unit 17 of the IC card processing apparatus 10 is contacted with the terminal unit 22 of the IC card 20. However, this invention is not limited to the above example, but applicable to a case where the IC card processing apparatus 10 communicates with the IC card 20 by a radio or the like without a contact.

The above embodiment has been still also described by way of an example where information about electronic money is stored in the memory 21 of the IC card 20. However, this invention is not limited to the above example, but applicable to a case where various numerical value data such as points used in a shopping district or the like is stored, bringing the same effects as the above embodiment.

The functions of the apparatus according to this invention are not limited to the above first to the seventh functions. According to this invention, it is possible to realize other various functions on the card unit processing apparatus.

This invention is not limited to the above embodiment, but can be modified variously in a region not departing from a gist of this invention, and executed.

What is claimed is:

1. A portable card-unit processing apparatus, adapted to be attached to a card unit having a storage, for performing various processes on the card unit, comprising:

a communicating unit for transfer of data between said apparatus and the card unit;

a display unit for displaying various kinds of information including data read from the storage of the card unit via said communicating unit;

a control unit for performing a plurality of control operations including a display state control operation, which controls a display state of said display unit, and a data reading/writing control operation, which controls writing and/or reading data to and/or from the storage of the card unit;

a power source unit for supplying electric power to said communicating unit, said display unit and said control unit; and a key unit operatively coupled with said control unit to give instructions to said control unit and including a first key for selecting one of a plurality of functions including the various processes to be performed on the card unit, a second key for ensuring the selection of said one function by said first key and for selecting one of a plurality of detailed items relating to said one selected functions, and a third key for executing a process relating to the one detailed item selected by said second key;

said control unit being operable to selectively perform said control operations in response to the instructions from said first key, said second key and said third key.

2. The portable card-unit processing apparatus according to claim 1, wherein said plurality of functions for selection by said first key include:

a numerical-data displaying function of displaying on said display unit numerical data stored in the storage of the card unit;

a transaction-history displaying function of displaying on said display unit a transaction history relating to the card unit; and a status displaying function of displaying on said display unit a security-status of the card unit.

3. The portable card-unit processing apparatus according to claim 2, wherein said plurality of functions for selection by said first key further include:

a status changing function of changing the security-status of the card unit;

a password changing function of changing a password of the card unit;

a personal-information writing function of writing personal information to the storage of the card unit;

a personal-information displaying function of displaying on said display unit the personal information stored in the storage of the card unit; and a personal-information changing function of changing the personal information stored in the storage of the card unit.

4. The portable card-unit processing apparatus according to claim 3, wherein when the card unit is attached to said apparatus, said control unit is operable to execute one of said plurality of functions as a first function and to display on said display unit information relating to said first function, and thereafter, said control unit is operable to display on said display unit the information relating to said plurality of functions successively one at each time said first key gives an instruction to said control unit.

5. The portable card-unit processing apparatus according to claim 4, wherein when said first key gives an instruction to said control unit while information relating to the last function among said plurality of functions is displayed on said display unit, said control unit is operable to again display on said display unit said information relating to said first function.

6. The portable card-unit processing apparatus according to claim 3, wherein when said first key gives an instruction to said control unit while one function selected by said first key is executed, said control unit is operable to display on said display unit an initial display of one of the function being currently executed and the function to be subsequently executed.

7. The portable card-unit processing apparatus according to claim 3, wherein when one of said status displaying function and said status changing function is selected, said control unit is operable to display on said display unit a security-status of the card unit.

8. The portable card-unit processing apparatus according to claim 3, wherein when said status changing function is selected if it is necessary to input/collate a password in order to change a status of the card unit, said control unit is operable to display on said display unit a default value in the first digit place in response to an instruction from said third key, to change the value in the first digit place in response to an instruction from said second key and to display on said display unit the changed value, to judge, in response to an instruction from said third key, a value displayed on said display unit at the time when said control unit receives an instruction from said third key as a value in the first digit place, to display on said display unit a default value in the next digit place in response to a succeeding instruction from said second key, to judge a value in each digit place in the same manner, to judge that inputting of said password is completed in response to succeeding instructions from said third key, and to transmit said inputted password to the card unit to request a change of the security-status of the card unit.

9. The portable card-unit processing apparatus according to claim 8, wherein when receiving a result of collation of said password in the card unit, said control unit is operable to display on said display unit said security-status of the card unit according to the result of the collation.

10. The portable card-unit processing apparatus according to claim 3, wherein when said password changing function is selected, said control unit is operable to display on said display unit a default value in the first digit place, in response to an instruction from said third key, to prompt an operator to input a current password, to change the value in the first digit place and to display on the display unit the changed value in response to an instruction from, said second key, to judge, in response to an instruction from said third key, a value displayed on said display unit at the time when said control unit receives an instruction from said third key as a value in the first digit place, to display on the display unit a default value in the next digit place in response to a following instruction from said second key, to judge a value in each digit place in a similar manner, to judge that inputting of said current password is completed by succeeding instructions from said third key, to display on said display unit a default value in the first digit place to prompt the operator to input a new password, to change the value in the first digit place and to display on said display unit the changed value in response to an instruction from said second key, to judge, in response to an instruction from said third key, a value displayed on said display unit at the time when said control unit gets an instruction from said third key as a value in the first digit place, to display on said display unit a default value in the next digit place in response to a succeeding instruction from said second key, to judge a value in each digit place in a similar manner, to judge that inputting of said new password is completed in response to succeeding instructions from said third key, and to transmit said current password and said new password inputted to the card unit to request the card unit to change the password.

11. The portable card-unit processing apparatus according to claim 3, wherein if when said personal-information displaying function is selected, said control unit is operable to display on said display unit a first piece of personal information stored in the storage of the card unit, and wherein if said storage of the card unit stores a plurality of pieces of personal information, said control unit is operable to display on said display unit said plurality of pieces of personal information successively one at each time said second key gives an instruction to said control unit.

12. The portable card-unit processing apparatus according to claim 11, wherein when said third key gives an instruction to said control unit while said personal-information displaying function is selected and executed, said control unit is operable to select one of said personal-information writing function and said personal-information changing function, and wherein when one of said personal-information writing function and said personal-information changing function is selected, said control unit is operable to write personal information being currently displayed on said display unit to the storage of the card unit in response to the instructions from said second key and said third key.

13. The portable card-unit processing apparatus according to claim 2, wherein when the card unit is attached to said apparatus, said control unit is operable to execute one of said plurality of functions as a first function and to display on said display unit information relating to said first function, and thereafter, said control unit is operable to display on said display unit the information relating to said plurality of functions successively one at each time said first key gives an instruction to said control unit.

14. The portable card-unit processing apparatus according to claim 13, wherein when said first key gives an instruction to said control unit while information relating to the last function among said plurality of functions is displayed on said display unit, said control unit is operable to again display on said display unit the information relating to said first function.

15. The portable card-unit processing apparatus according to claim 2, wherein when said first key gives an instruction to said control unit while one function selected by said first key is executed, said control unit is operable to display on said display unit an initial display of one of the function being currently executed and the function to be subsequently executed.

16. The portable card-unit processing apparatus according to claim 2, wherein when said numerical-data displaying function is selected, said control unit is operable to display on said display unit a group of numerical data registered as a first-come group in the storage of the card unit, wherein if said-storage of the card unit stores a plurality of groups of numerical data, said control unit is operable to display on said display unit said plurality of groups of numerical data successively one at each time said second key gives an instruction to said control unit, and wherein when said second key gives an instruction while the last group among said plurality of groups of numerical data is displayed on said display unit, said control unit is operable to again display on said display unit the first-come group.

17. The portable card-unit, processing apparatus according to claim 16, wherein when said third key gives an instruction to said control unit while a group of numerical data other than the first-come group is displayed on said display unit, said control unit is operable to register said numerical data being currently displayed on said display unit as a first-come group in the storage of the card unit.

18. The portable card-unit processing apparatus according to claim 16, wherein when the first key gives an instruction to said control unit while said numerical-data displaying function is selected and executed, said control unit is operable to select said transaction-history displaying function, wherein when said transaction-history displaying function is selected, said control unit is operable to display on said display unit a transaction history relating to a group of numerical data having been displayed on said display unit when said first key gives an instruction to said control unit, wherein if said storage ofthe card unit stores a plurality of transaction histories relating to said group of numerical data having been displayed, said control unit is operable to display on said display unit said plurality of transaction histories successively one at each time said second key gives an instruction to said control unit, and wherein when said second key gives an instruction to said control unit while the last transaction history is displayed on said display unit, said control unit is operable to again display on said display unit the transaction history displayed first.

19. The portable card-unit processing apparatus according to claim 18, wherein said control unit is operable to display on said display unit the transaction history which contains a transaction type, a history number and a transaction value, one by each transaction relating to a group of numerical data.

20. The portable card-unit processing apparatus according to claim 19, wherein said control unit is operable to display on said display unit a transaction history which contains a transaction data/time, for alternation with the transaction history which contains the transaction type, the history number and the transaction value.

21. The portable card-unit processing apparatus according to claim 20, wherein said control unit is operable to change an arrangement of said transaction data/time and contents of the display according to a type of said numerical date, and to display on said display unit the changed transaction data/time and the contents of the display.

22. The portable card-unit processing apparatus according to claim 18, wherein when said control unit displays on said display unit a plurality of transaction histories successively one at each time said second key gives an instruction to said control unit, said control unit is operable to display on said display unit said plurality of transaction histories in order of time from the latest transaction history or the oldest transaction history.

23. The portable card-unit processing apparatus according to claim 18, wherein after the last transaction history is displayed of said display unit in response to an instruction from said second key, the control unit is operable to display on said display unit final history display information reporting that all transaction histories relating to said numerical data have been displayed.

24. The portable card-unit processing apparatus according to claim 2, wherein when the card unit is attached to said apparatus, said control unit is operable to start reading data stored in the storage of the card unit, and upon reading initial display information relating to one of said functions, to display on said display unit the initial display information.

25. The portable card-unit processing apparatus according to claim 24, further comprising a judging register in which a reading-completion flag is to be set at each unit of read information for data having been read from the storage of the card unit by said control unit, wherein if said reading-completion flag is set to data requested to be displayed in said judging register, said control unit is operable to display on said display unit said requested data.

26. The portable card-unit processing apparatus according to claim 1, wherein when the card unit is attached to said apparatus, said control unit is operable to perform one of said control operations on the card unit, and wherein when the card unit is not attached to said apparatus, said control unit is operable to perform an original function using said display unit.

27. The portable card-unit processing apparatus according to claim 26, wherein said control unit is operable to perform, as said original function, a clock displaying function of displaying on said display unit a current time.

28. The portable card-unit processing apparatus according to claim 27, wherein when said third key lives an instruction to said control unit while said clock displaying function is selected and executed, said control unit is operable to shift to a time adjust mode to change the current time being displayed on said display unit in response to the instructions from said first key, said second key and said third key.

29. The portable card-unit processing apparatus according to claim 27, wherein said control unit is operable to display on said display unit the current time during a predetermined display period.

30. The portable card-unit processing apparatus according to, claim 29, wherein, in addition to said display period, said control unit is operable to temporarily display on said display unit the current time only when one of said first key, said second key and said third key gives an instruction to said control unit.

31. The portable card-unit processing apparatus according to claim 26, wherein said control unit is operable to perform, as said original function, a memorandum function of storing memorandum information in a memorandum-information storing unit and displaying on said display unit said memorandum information stored in said memorandum information storing unit in response to the instructions from said first key, said second key and said third key.

32. The portable card-unit processing apparatus according to claim 26, wherein said control unit is operable to selectively execute said original function, to display on said display unit information relating to the selected function, and to change said information displayed on said display unit, in response to the instructions from said first key, said second key and said third key.

33. The portable card-unit processing apparatus according to claim 1, wherein when the card unit is not attached to said apparatus, said apparatus is operable to shift to a low power consumption mode to save electric power to be supplied from said power source unit to said display unit and said control unit.

34. The portable card-unit processing apparatus according to claim 33, wherein a program for judging whether said apparatus is shifted to said low power consumption mode is installed and executed in said control unit.

35. The portable card-unit processing apparatus according to claim 33, further comprising a plurality of oscillators for oscillating clocks having different frequencies, and a switching unit for selectively switching to a clock fed from one of said plurality of oscillators and outputting the selected clock to said control unit, wherein in said low power consumption mode, said switching unit is operable to select a clock from an oscillator which oscillates a low frequency clock and to output the clock to said control unit.

* * * * *